United States Patent
Taguchi et al.

(10) Patent No.: US 6,402,980 B1
(45) Date of Patent: *Jun. 11, 2002

(54) OXIDE MAGNETIC MATERIAL, FERRITE PARTICLES, BONDED MAGNET, SINTERED MAGNET, PROCESS FOR PRODUCING THE SAME, AND MAGNETIC RECORDING MEDIUM

(75) Inventors: Hitoshi Taguchi; Kiyoyuki Masuzawa, both of Chiba; Yoshihiko Minachi, Shizuoka; Kazumasa Iida; Miyuki Kawakami, both of Chiba, all of (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/314,628
(22) Filed: May 19, 1999

Related U.S. Application Data

(63) Continuation of application No. PCT/JP98/04242, filed on Sep. 21, 1998.

(30) Foreign Application Priority Data

Sep. 19, 1997 (JP) ............................................. 9-273928
Jul. 3, 1998 (JP) ........................................... 10-204433

(51) Int. Cl.$^7$ ................................................ H01F 1/00
(52) U.S. Cl. .................................. 252/62.63; 252/62.57
(58) Field of Search ........................... 252/62.63, 62.57

(56) References Cited

U.S. PATENT DOCUMENTS 3,114,714 A    12/1963   Baum et al. ............. 252/62.63
4,820,433 A     4/1989   Yamamoto ............... 252/62.57

(List continued on next page.)

FOREIGN PATENT DOCUMENTS

EP    0 592 922 A2   4/1994
EP    0 758 786 A1   2/1997

(List continued on next page.)

OTHER PUBLICATIONS

F. K. Lotgering et al, "Composition and Magnetic Properties of Hexagonal Ca, La Ferrite with Magnetoplumbite Structure", Solid State Communications, vol. 34, pp. 49–50, 1980.

(List continued on next page.)

*Primary Examiner*—C. Melissa Koslow
(74) *Attorney, Agent, or Firm*—Oblon, Spivak, McClelland, Maier & Neustadt, P.C.

(57) ABSTRACT

The present invention provides an oxide magnetic material, which includes a primary phase of a hexagonal ferrite containing metallic elements Ca, R, Fe and M, where M represents at least one element selected from the group including Co, Ni and Zn, and R represents at least one element selected from the group including Bi and rare earth elements including Y, with La being essentially included in R; wherein the proportions of the metallic elements Ca, R, Fe and M with respect to the total amount of the metallic elements are from 1 to 13 atomic % for Ca, from 0.05 to 10 atomic % for R, from 80 to 95 atomic % for Fe, and from 1 to 7 atomic % for M. The present invention also provides ferrite particles, a bonded magnet, a sintered magnet, a process for producing them, and a magnetic recording medium, which contain the oxide magnetic material.

12 Claims, 15 Drawing Sheets

U.S. PATENT DOCUMENTS

| | | | |
|---|---|---|---|
| 5,055,322 A | 10/1991 | Yamamoto | 427/128 |
| 5,607,615 A | 3/1997 | Taguchi et al. | 252/62.63 |
| 5,648,039 A | 7/1997 | Taguchi et al. | 264/428 |
| 5,811,024 A | 9/1998 | Taguchi et al. | 252/62.63 |
| 5,846,449 A * | 12/1998 | Taguchi et al. | 252/62.62 |
| 5,945,028 A | 8/1999 | Taguchi et al. | 252/62.63 |
| 5,951,937 A * | 9/1999 | Taguchi et al. | 264/427 |
| 6,139,766 A * | 10/2000 | Taguchi et al. | 252/62.61 |

FOREIGN PATENT DOCUMENTS

| | | |
|---|---|---|
| JP | 52-79295 | 7/1977 |
| JP | 55-130862 | 10/1980 |
| JP | 58-199722 | 11/1983 |
| JP | 60-63715 | 12/1985 |
| JP | 63-260103 | 10/1988 |
| JP | 63-260104 | 10/1988 |
| JP | 63-260105 | 10/1988 |
| JP | 63-260109 | 10/1988 |
| JP | 1-274403 | 11/1989 |
| JP | 10-149910 | 6/1998 |

OTHER PUBLICATIONS

G. A. Smolenskii et al, "Investigation of Ferrimagnets with the Structure of Magnetoplumbite and Garnet in Strong Pulse Magnetic Fields", Bull. Acad. Sci. vol. 25, pp. 1405–1408, 1961.

V. N. Mulay et al, "Synthesis & Properties of Some New Ferrites of Formula $La^{3+}Me^{2+}Fe^{3}_{11}·O_{19}$·", Indian Journal of Pure & Applied Physics, vol. 8, pp. 412–415, 1970.

* cited by examiner

OXIDE MAGNETIC MATERIAL, FERRITE PARTICLES, BONDED MAGNET, SINTERED MAGNET, PROCESS FOR PRODUCING THE SAME, AND MAGNETIC RECORDING MEDIUM

This application is a continuation of International application Ser. No. PCT/JP98/04242 Filed on Sep. 21, 1998.

TECHNICAL FIELD

The present invention relates to magnet powder and a sintered magnet comprising a hexagonal ferrite, a bonded magnet and a magnetic recording medium comprising the magnet powder, and a magnetic recording medium having a thin film magnetic layer comprising a hexagonal ferrite phase.

TECHNICAL BACKGROUND

As a material for an oxide permanent magnet, a magnetoplumbite (M type) hexagonal strontium (Sr) ferrite or barium (Ba) ferrite has been mainly used. Calcium (Ca), which is one of the alkaline earth elements as similar to Ba and Sr, has not been used as a magnet material though it is not expensive because Ca does not form a hexagonal ferrite.

In general, a Ca ferrite has a stable structure of $CaO\text{-}Fe_2O_3$ or $CaO\text{-}2Fe_2O_3$, and does not form a hexagonal ferrite ($CaO\text{-}6Fe_2O_3$), but it has been known that a hexagonal ferrite is formed by adding La. In this case, it is considered that the valence of a part of the Fe ion is changed ($Fe^{3+}$ to $Fe^{2+}$) to compensate the difference in valence between La and Sr ($La^{3+}$ and $Sr^{2+}$). However, the magnetic characteristics obtained in this case is those equivalent to a Ba ferrite at most, which is not considerably high. Furthermore, there has been no example in that an element forming a divalent ion and La are complexly added to a Ca ferrite.

What are important among characteristics of a magnet are a residual magnetic flux density (Br) and an intrinsic coercive force (HcJ).

Br is determined by the density of the magnet, the degree of orientation of the magnet, and the saturation magnetization ($4\pi Is$) determined by the crystal structure. Br is expressed by the following equation:

$$Br = 4\pi Is \times (\text{degree of orientation}) \times (\text{density})$$

The Sr ferrite and the Ba ferrite of M type has a $4\pi Is$ value of about 4.65 kG. The density and the degree of orientation each is about 98% at most in the sintered magnet, which provides the highest values. Therefore, Br of these magnets is limited to about 4.46 kG at most, and it has been substantially impossible to provide a high Br value of 4.5 kG or more.

The inventor of the invention have found that the addition of appropriate amounts of La and Zn in an M type ferrite raises its $4\pi Is$ value by about 200 G at most, and a Br value of 4.4 kG or more can be obtained, as described in U.S. patent application Ser. No. 08/672,848, now U.S. Pat. No. 5,846,449. In this case, however, since the anisotropic magnetic field ($H_A$), which will be described later, is decreased, it is difficult to obtain a Br value of 4.4 kG or more and an HcJ of 3.5 kOe or more at the same time.

HcJ is in proportion to the product ($H_A \times fc$) of the anisotropic magnetic field ($H_A$ ($=2K_1/Is$)) and a single magnetic domain grain fraction (fc), in which $K_1$ represents a crystal magnetic anisotropy constant, which is determined by the crystal structure as similar to Is. The M type Ba ferrite has $K_1$ of $3.3 \times 10^6$ erg/cm$^3$, and the M type Sr ferrite has $K_1$ of $3.5 \times 10^6$ erg/cm$^3$. It has been known that the M type Sr ferrite has the largest $K_1$ value, but it has been difficult to further raise the $K_1$ value.

On the other hand, in the case where ferrite grains are in a single magnetic domain condition, the maximum HcJ is expected because the magnetization must be rotated against the anisotropic magnetic field to reverse the magnetization. In order to make ferrite grains into single magnetic domain grains, the size of the ferrite grains must be smaller than the following critical diameter (dc) expressed by the following equation:

$$dc = 2(k \cdot Tc \cdot K_1/a)^{1/2}/Is^2$$

wherein k represents the Boltzman constant, Tc represents a Curie temperature, and a represents a distance between iron ions. In the case of the M type Sr ferrite, since dc is about 1 μm, it is necessary for producing a sintered magnet that the crystal grain size of the sintered magnet must be controlled to 1 μm or less. While it has been difficult to realize such a fine crystal grain and the high density and the high degree of orientation to provide a high Br at the same time, the inventor has proposed a new production process to demonstrate that superior characteristics that cannot be found in the art are obtained, as described in U.S. Pat. No. 5,648,039. In this process, however, the HcJ value becomes 4.0 kOe when the Br value is 4.4 kG, and therefore it has been difficult to obtain a high HcJ of 4.5 kOe or more with maintaining a high Br of 4.4 kG or more at the same time.

In order to control a crystal grain size of a sintered body to 1 μm or less, it is necessary to make the grain size in the molding step 0.5 μm or less with taking the growth of the grains in the sintering step into consideration. The use of such fine grains brings about a problem in that the productivity is generally deteriorated due to increase in molding time and increase in generation of cracks on molding. Thus, it has been very difficult to realize high characteristics and high productivity at the same time.

It has been known that the addition of $Al_2O_3$ and $Cr_2O_3$ is effective to obtain a high HcJ value. In this case, $Al^{3+}$ and $Cr^{3+}$ have effects of increasing $H_A$ and suppressing the grain growth by substituting for $Fe^{3+}$ having an upward spin in the M type structure, so that a high HcJ value of 4.5 kOe or more is obtained. However, when the Is value is reduced, the Br value is considerably reduced since the sintered density is reduced. As a result, the composition exhibiting the maximum HcJ of 4.5 kOe can only provide a Br value of 4.2 kG.

A sintered magnet of the conventional anisotropic M type ferrite has a temperature dependency of HcJ of about +13 Oe/° C. and a relatively high temperature coefficient of about from +0.3 to +0.5%/° C., which sometimes bring about great reduction in HcJ on the low temperature side and thus demagnetization. In order to prevent such demagnetization, the HcJ value at room temperature must be a large value of about 5 kOe, and therefore it is substantially impossible to obtain a high Br value at the same time. Powder of an isotropic M type ferrite has a temperature dependency of HcJ of at least about +8 Oe/° C., although it is superior to the anisotropic sintered magnet, and a temperature coefficient of +0.15%/° C., and thus it has been difficult to further improve the temperature characteristics.

The inventors have proposed that the temperature dependency of HcJ is reduced by introducing distortion into ferrite grains by pulverization, as described in U.S. Pat. No. 5,468,039. In this case, however, HcJ at room temperature is also decreased, and thus the high HcJ at room temperature and its temperature characteristics cannot be improved at the same time.

DISCLOSURE OF THE INVENTION

An object of the invention is to realize a hexagonal ferrite having both a high saturation magnetization and a high magnetic anisotropy, so as to provide a ferrite magnet having a high residual magnetic flux density and a high coercive force, which cannot be realized by the conventional hexagonal ferrite magnet.

Another object of the invention is to provide a ferrite magnet excellent in temperature characteristics of the coercive force, where in particular, reduction of the coercive force in a low temperature region is small.

Further object of the invention is to provide a ferrite magnet having a high residual magnetic flux density and a high coercive force by using relatively coarse ferrite grains having a diameter exceeding 1 µm.

Still further object of the invention is to provide a magnetic recording medium having a high residual magnetic flux density and being thermally stable.

The objects of the invention can be attained by one of the constitutions (1) to (13) described below.

(1) An oxide magnetic material comprising a primary phase of a hexagonal ferrite containing Ca, R, Fe and M, where M represents at least one element selected from the group consisting of Co, Ni and Zn, and R represents at least one element selected from the group consisting of Bi and rare earth elements including Y, with La being essentially included in R.

(2) An oxide magnetic material as in item (1), wherein proportions of the metallic elements Ca, R, Fe and M with respect to the total amount of the metallic elements are from 1 to 13 atomic % for Ca,
from 0.05 to 10 atomic % for R,
from 80 to 95 atomic % for Fe, and
from 1 to 7 atomic % for M.

(3) An oxide magnetic material as in item (1) or (2), wherein proportions of the metallic elements Ca, R, Fe and M is represented by formula (I):

$$Ca_{1-x}R_x(Fe_{12-y}M_y)_zO_{19} \quad (I)$$

wherein $0.2 \leq x \leq 0.8$,
$0.2 \leq y \leq 1.0$, and
$0.5 \leq z \leq 1.2$.

(4) An oxide magnetic material as in one of items (1) to (3), wherein a proportion of Co in M is 10 atomic % or more.

(5) Ferrite particles comprising an oxide magnetic material as in one of items (1) to (4).

(6) Ferrite particles as in item (5), wherein the ferrite grains have a temperature dependency of a coercive force $\Delta HcJ/\Delta T$ within the range of from −50 to 50° C. is from −5 to 5 Oe/° C.

(7) A bonded magnet comprising ferrite particles as in item (5) or (6).

(8) A magnetic recording medium comprising ferrite particles as in item (5) or (6).

(9) A sintered magnet comprising an oxide magnetic material as in one of items (1) to (4).

(10) A sintered magnet as in item (9), wherein the sintered magnet has a temperature dependency of a coercive force $\Delta HcJ/\Delta T$ within the range of from −50 to 50° C. is from −5 to 10 Oe/° C.

(11) A sintered magnet as in item (9) or (10), wherein the sintered magnet has an intrinsic coercive force HcJ in terms of kOe and a residual magnetic flux density Br in terms of kG satisfying the following conditions at 25° C.:

$$Br + \tfrac{1}{3}HcJ \geq 5.75 \text{ where } HcJ \geq 4 \quad (IV)$$

$$Br + \tfrac{1}{10}HcJ \geq 4.82 \text{ where } HcJ < 4 \quad (V)$$

(12) A process for producing ferrite grains as in item (5) or (6), wherein calcination or sintering is conducted in an atmosphere having an oxygen partial pressure of more than 0.05 atm.

(13) A process for producing a sintered magnet as in one of claims (9) to (11), wherein calcination or sintering is conducted in an atmosphere having an oxygen partial pressure of more than 0.2 atm.

FUNCTION AND EFFECT

The composition of the invention comprises a hexagonal Ca series ferrite, to which at least optimum amounts of R and M are added, as shown by the formulae described in the foregoing. By using this composition, excellent magnetic characteristics can be obtained, and at the same time, the temperature characteristics of HcJ can be considerably improved. Furthermore, in the case Co is used as M, while Is is not lowered, rather Is and $K_1$ are simultaneously increased to increase $H_A$, and thus a high Br value and a high HcJ value are realized. Specifically, in the sintered magnet of the invention where Co is used as M, the characteristics satisfying the equations (IV) and (V) above can be obtained at room temperature of about 25° C. It has been reported that the conventional Sr ferrite sintered magnet exhibits Br of 4.4 kG and HcJ of 4.0 kOe, but none has been obtained that has HcJ of 4 kOe or more and satisfies the equation (IV). In other words, if HcJ is increased, Br must be low. In the sintered magnet of the invention, although the combination addition of Co and Zn lowers the coercive force lower than the case of the single addition of Co, in some cases lower than 4 kOe, the residual magnetic flux density is considerably increased. At this time, the magnetic characteristics satisfying the equation (V) are obtained. There has been no conventional Sr ferrite sintered magnet having HcJ of less than 4 kOe that satisfies the equation (V). Furthermore, in the invention, the temperature characteristics of HcJ are considerably improved in the case where Ni is added.

The M type ferrite of the invention having a composition where Co is used as M has a saturation magnetization (4πIs) increased by about 2%, and a crystal magnetic anisotropy constant ($K_1$) or an anisotropic magnetic field ($H_A$) increased by 10 to 20% at most. As the precise measurement of the crystal magnetic anisotropy constant ($K_1$) and the anisotropic magnetic field ($H_A$) is not so easy, there has been no established measurement method, but there can be exemplified a method, in which a torque curve of the anisotropic sample is measured by a torque meter, and then analyzed, to obtain the crystal magnetic anisotropy constants ($K_1$, $K_2$, etc.), a method, in which the initial magnetization curve of the anisotropic sample is measured for the direction of an axis easily magnetized (c axis) and the direction of an axis hardly magnetized (a axis), and the anisotropic magnetic field ($H_A$) is obtained from the point of intersection thereof, and a method, in which the anisotropic magnetic field ($H_A$) is obtained from the differential of second order of the initial magnetization curve in the direction of an axis hardly magnetized (a axis).

When the anisotropic magnetic field $H_A$ of the invention is measured by the method, in which the initial magnetization curve of the anisotropic sample is measured for the direction of an axis easily magnetized (c axis) and the direction of an axis hardly magnetized (a axis), and the anisotropic magnetic field ($H_A$) is obtained from the point of intersection thereof, a large value of at least 19 kOe or more, and further 20 kOe or more at most, can be obtained. This becomes an improvement by 10% at most in comparison to the Sr ferrite of the conventional composition.

While the invention exhibits a greater effect of enhancing the HcJ when applied to a sintered magnet, ferrite grains produced according to the invention can be mixed with a binder, such as plastics and rubber, to form a bonded magnet.

The ferrite grains and the sintered magnet of the invention have a small temperature dependency of HcJ, and particularly the ferrite grains of the invention have a considerably small temperature dependency of HcJ. Specifically, the sintered magnet of the invention has a temperature dependency of HcJ within a range of from −50 to 50° C. of from −5 to 11 Oe/° C. (0.23%/° C. or less assuming that HcJ at 25° C. is 3 kOe), which can be easily reduced to from −5 to 5 Oe/° C. (0.17%/° C. or less assuming that HcJ at 25° C. is 3 kOe). The ferrite grains of the invention have an absolute value of a temperature coefficient of HcJ within a range of from −50 to 50° C. of 5 Oe/° C. or less (0.17%/° C. or less assuming that HcJ at 25° C. is 3 kOe), which can be easily reduced to 1 Oe/° C. or less (0.04%/° C. or less assuming that HcJ at 25° C. is 3 kOe). It is possible that the temperature coefficient can be zero. Such superior magnetic characteristics under the low temperature environment cannot be attained by the conventional Sr ferrite magnet.

The invention involves a coating type magnetic recording medium having a magnetic layer comprising the ferrite grains dispersed in a binder. The invention also involves a magnetic recording medium having a thin film magnetic layer having the hexagonal magnetoplumbite ferrite phase as similar to the above-described magnet. In these cases, a magnetic recording medium of a high output and a high S/N ratio can be realized owing to the high residual magnetic flux density. Since the magnetic recording medium of the invention can be used as a magnetic recording medium for normal magnetic recording, the recording density can be high. Furthermore, since an absolute value of the temperature coefficient of HcJ can be small, a thermally stable magnetic recording medium can be realized.

A Ba ferrite represented by the following formula:

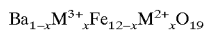

is disclosed in *Bull. Acad. Sci. USSR, phys. Ser.* (English Transl.), vol. 25 (1961), pp. 1405–1408 (hereinafter referred to as Reference 1). In this Ba ferrite, $M^{3+}$ is $La^{3+}$, $Pr^{3+}$ or $Bi^{3+}$, and $M^{2+}$ is $Co^{2+}$ or $Ni^{2+}$. While it is not clear as to whether Ba ferrite of Reference 1 is powder or a sintered body, this is similar to the Ca ferrite of the invention in the point of inclusion of La and Co. FIG. 1 of Reference 1 shows the change of saturation magnetization depending on the change of x for a Ba ferrite containing La and Co, but in FIG. 1, the saturation magnetization is reduced with the increase of x. Although Reference 1 discloses that the coercive force increases by a few times, there is not disclosure of specific values.

In the invention, on the other hand, by employing the composition, to which the optimum amounts of La and Co, Ni and Zn are added, for the Ca ferrite sintered magnet, the considerable increase of HcJ or the slight increase of Br, and/or the considerable improvement in temperature dependency of HcJ are realized. In the invention, by adding the optimum amounts of La and Co, Ni and Zn to the Ca ferrite particles, the HcJ is greatly increased or its temperature dependency is considerably reduced. It is firstly found in the invention that the combination addition of La and Co, Ni and Zn to a Ca ferrite provides such effects.

A ferrite represented by the following formula:

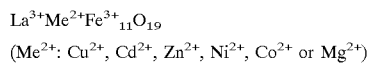

is disclosed in *Indian Journal of Pure and Applied Physics*, vol. 8, July 1970, pp.412–415 (hereinafter referred to as Reference 2). This ferrite is similar to the ferrite grains and the sintered magnet of the invention in the point of inclusion of La and Co. However, this ferrite does not contain Ca. In Reference 2, the saturation magnetization as when $Me^{2+}$ is $Co^{2+}$ is such low values of 42 cgs unit at room temperature and 50 cgs unit at 0K. While specific values are not disclosed, Reference 2 states that it cannot be a magnet material due to a low coercive force. It is considered this is because the composition of the ferrite of Reference 2 deviates the scope of the invention (the amounts of La and Co are too large).

An isometric hexagonal ferrite pigment represented by the following formula:

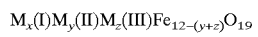

is disclosed in Japanese Patent Application Kokai No. 62-100417 (hereinafter referred to as Reference 3). In the formula, M(I) is a combination of Sr, Br, a rare earth metal, etc. with a monovalent cation; M(II) is Fe(II), Mn, Co, Ni, Cu, Zn, Cd or Mg; and M(III) is Ti, etc. The hexagonal ferrite pigment disclosed in Reference 3 is similar to the ferrite grains and the sintered magnet of the invention in the point that a rare earth metal and Co are simultaneously contained. However, Reference 3 does not disclose any example in that La, Co and Ca are simultaneously added, and there is no disclosure that the simultaneous addition of them improves the saturation magnetization and the coercive force and provides excellent temperature characteristics of HcJ. Furthermore, in the examples of Reference 3 where Co is added, Ti is simultaneously added as the element of M(III). Because the element of M(III), particularly Ti, functions as an element lowering the saturation magnetization and the coercive force, it is clear that Reference 3 does not suggest the constitution and the effect of the invention.

An optomagnetic recording medium comprising a magnetoplumbite barium ferrite characterized by substituting a part of Ba with La and a part of Fe with Co is disclosed in Japanese Patent Application Kokai No. 62-119760 (hereinafter referred to as Reference 4). This Ba ferrite is similar to the Ca ferrite of the invention in the point of inclusion of La and Co. However, the ferrite of Reference 4 is a material for "optomagnetic recording" in which information is written as a magnetic domain in a magnetic thin film by utilizing a heat effect of light, and the information is read out by utilizing a optomagnetic effect, which is of a technical field different from the magnet and the "magnetic recording" medium of the invention. Furthermore, in Reference 4, Ba, La and Co are essential in the compositional formula (I), and in the formulae (II) and (III), there is only disclosed that an unidentified tetra-valent metallic ion is added thereto. On the other hand, the ferrite of the invention is the Ca ferrite, in which Ca is essential, and the optimum amounts of La and Co are added thereto, which is different from the composition of Reference 4. That is, as explained with respect to Reference 1, the Ca ferrite of the invention realizes the considerable increase of HcJ and the slight increase of Br, and also realizes the considerable improvement in temperature dependency of HcJ, by using the composition of the Ca ferrite containing the optimum amounts of La and Co. This is firstly realized in the composition of the invention, which is different from Reference 4.

A ferrite magnet having the basic composition represented by the following formula:

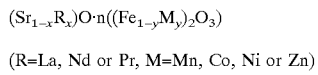

(R=La, Nd or Pr, M=Mn, Co, Ni or Zn)

is disclosed in Japanese Patent Application Kokai No. 10-149910. While the addition of $CaCO_3$ is disclosed in the reference, this is a conventional method as a combination addition with $SiO_2$, which aims at "control of the sintering phenomenon (suppression and acceleration of grain growth). On the other hand, the invention uses Ca as the basic composition of ferrite, which is clearly different from the reference.

A ferrite magnet containing Ca, La and Sr is disclosed in Japanese Patent Application Kokai No. 52-79295. While this is a hexagonal M type ferrite containing Ca along with La as the basic composition, it does not contain Co, Ni, Zn, etc. (element M), which is clearly different from the invention.

In comparison to the above-described conventional ferrite materials, the ferrite material of the invention has the following characteristics.

(1) It exhibits superior characteristics in comparison to the Sr-R-M system (R=La, Nd or Pr, M=Mn, Co, Ni or Zn, disclosed in Japanese Patent Application No. 10-60682) in the point that superior characteristics can be obtained at an ordinary temperature, and the temperature characteristic of HcJ becomes substantially zero.

(2) The above-described temperature characteristics re realized by the characteristics of x=y=0.5 and z=0.85. In the case of the Sr-R-M system and the Ba-R-M ystem, the maximum values of Br and HcJ are obtained at x=y=0.1 to 0.4, but in the case of the Ca-R-M system, Br and HcJ become the maximum when x=y=0.4 to 0.6.

(3) The ferrite grains after calcination are liable to be deformed into a flat form. Therefore, they are suitable as magnetic powder for a mechanically oriented bonded magnet, such as a rubber magnet. In this case, although a flux component, such as barium chloride, has conventionally been added to make the flat shape, this addition can be omitted to render the production cost low.

(4) In the Ca-R-M system, the dependency of HcJ on the atmosphere on the sintering step is large. For example, as demonstrated in the examples described later, HcJ is 3.1 kOe when the sintering is conducted in the air with x=y=0.4, it is greatly increased to 4.2 kOe when the sintering is conducted in oxygen.

BEST MODES FOR PRACTICING THE INVENTION

Figure 1A:
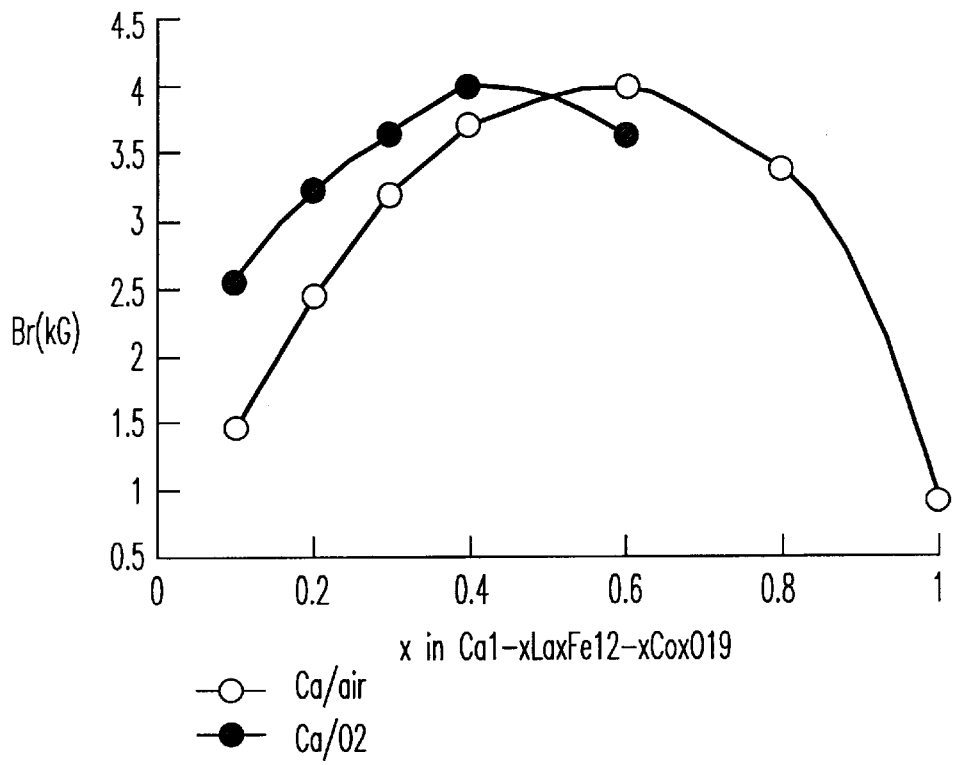
FIG. 1 is a graph showing the magnetic characteristics (Br and HcJ) of $Ca_{1-x1}La_{x1}Fe_{12-x1}Co_{x1}$ (A=Ca) wherein x=y=0 to 1, and Z=1.

The oxide magnetic material of the invention comprises a primary phase of a hexagonal ferrite, preferably hexagonal magnetoplumbite (M type) ferrite, containing Ca, R, Fe and M, where M represents at least one element selected from the group consisting of Co, Ni and Zn, and R represents at least one element selected from the group consisting of Bi and rare earth elements including Y, with La being essentially included in R.

It is preferred that the proportions of the metallic elements Ca, R, Fe and M with respect to the total amount of the metallic elements are from 1 to 13 atomic % for Ca, from 0.05 to 10 atomic % for R, from 80 to 95 atomic % for Fe, and from 1 to 7 atomic %, especially from 3 to 8 atomic % for M.

These are more preferably from 3 to 11 atomic % for Ca, from 0.2 to 6 atomic % for R, from 83 to 94 atomic % for Fe, and from 3 to 5 atomic % for M.

In the constitutional elements, when the amount of Ca is too small, the M type ferrite is not formed, or the amount of a non-magnetic phase, such as $\alpha$-$Fe_2O_3$, is increased. When the amount of Ca is too large, the M type ferrite is not formed, or the amount of a non-magnetic phase, such as $CaFeO_{3-x}$, is increased.

When the amount of R is too small, the amount of M forming a solid solution becomes small, and thus the effect of the invention is difficult to be obtained. The amount of R is too large, the amount of a non-magnetic foreign phase, such as orthogonal ferrite, becomes large. R is at least one element selected from the group consisting of Bi and rare earth elements including Y, with La being essentially included in R. It is most preferred that R is only La.

The element M is at least one element selected from the group consisting of Co, Ni and Zn. When the amount of M is too small, the effect of the invention is difficult to be obtained. When the amount of M is too large, Br and HcJ are reduced, and the effect of the invention is difficult to be obtained. The proportion of Co in M is preferably 10 atomic % or more, more preferably 20 atomic % or more. When the proportion of Co is too small, the improvement in coercive force becomes insufficient.

The oxide magnetic material of the invention is preferably represented by formula (I):

$$Ca_{1-x}R_x(Fe_{12-y}M_y)_zO_{19} \quad (I)$$

wherein x, y and z represents molar numbers, and $0.2 \leq x \leq 0.8$, $0.2 \leq y \leq 1.0$, and $0.5 \leq z \leq 1.2$.

It is more preferably $0.4 \leq x \leq 0.6$, $0.4 \leq y \leq 0.8$, and $0.5 \leq z \leq 1.0$.

In the above formula, when x is too small, i.e., the amount of the element La is too small, the amount of the element M forming a solid solution with the hexagonal ferrite cannot be large, and thus the improving effect of the saturation magnetization and/or the improving effect of the anisotropic magnetic field become insufficient. When x is too large, the element R cannot substitute in the hexagonal ferrite to form a solid solution, and the saturation magnetization is reduced due to the formation of an orthogonal ferrite containing La. When y is too small, the improving effect of the saturation magnetization and/or the improving effect of the anisotropic magnetic filed becomes insufficient. When y is too large, the element M is difficult to substitute in the hexagonal ferrite to form a solid solution. Even in the range where the element M can substitute to form a solid solution, deterioration of the anisotropic constant ($K_1$) and the anisotropic magnetic field ($H_A$) becomes large. When z is too small, the saturation magnetization is reduced since the amounts of non-magnetic phases containing Ca and the element R are increased. When z is too large, the saturation magnetization is reduced since the amount of an $\alpha$-$Fe_2O_3$ phase or a non-magnetic spinel ferrite phase containing the element M is increased. The above formula (I) assumes that no impurity is contained.

In the above formula (I) showing the composition, the molar number of oxygen atoms of 19 means the stoichiometric compositional ratio when all the elements R are trivalent, and x=y and z=1. Thus, the molar number of oxygen atoms changes depending on the kind of the element R and the values of x, y and z. In the case where the sintering atmosphere is a reducing atmosphere, there is a possibility of forming lack of oxygen (vacancy). Furthermore, while Fe is generally present as trivalent in the M type ferrite, there is a possibility of changing it to divalent. There is a possibility that the valence of the element represented by M, such as Co, is changed, and the proportion of oxygen to the metallic elements is also changed according thereto. While the molar number of oxygen atoms is shown as 19 irrespective to the kind of R and the values of x, y and z in the specification, the actual number of oxygen atoms may be somewhat deviated from the stoichiometric compositional ratio. For example, when divalent Fe is formed in the Ca ferrite, it is considered that the specific resistivity of the ferrite is lowered ($Fe^{2+}$ to $Fe^{3+}+e^-$). In the case of a polycrystalline body, the resistivity of grain boundaries is generally larger than the intra-grain resistivity. The specific resistivity of the actual sintered magnet may change due to this factor.

The composition of the oxide magnetic material can be measured by fluorescent X-ray quantitative analysis. The presence of the primary phase described above is confirmed by X-ray diffraction and electron beam diffraction.

The oxide magnetic material may contain Sr of less than 49 atomic %, especially less than 30 atomic %, though Sr is not usually contained in the oxide magnetic material.

The oxide magnetic material may contain $B_2O_3$. The calcination temperature and the sintering temperature can be lowered by the addition of $B_2O_3$, which is advantageous from the standpoint of productivity. The content of $B_2O_3$ is preferably 0.5% by weight or less based on the total amount of the oxide magnetic material. When the content of $B_2O_3$ is too large, the saturation magnetization becomes low.

At least one of Na, K and Rb may be contained in the oxide magnetic material. The total content of these elements, as converted into $Na_2O$, $K_2O$ and $Rb_2O$, is preferably 3% by weight or less based on the total amount of the oxide magnetic material. When the content of these elements is too large, the saturation magnetization becomes low. As these elements are represented by $M^I$, $M^I$ are contained in the ferrite in the form of the following formula:

$$Ca_{1.3-2a}La_aM^I_{a-0.3}Fe_{11.7}M_{0.3}O_{19}$$

In this case, it is preferred that $0.3 < a \leq 0.5$. When a is too large, the saturation magnetization becomes low, and additionally a problem arises in that a large amount of the element $M^I$ is evaporated on sintering.

In addition to these impurities, Si, Al Ga, In, Li, Mg, Mn, Ni, Cr, Cu, Ti, Zr, Ge, Sn, V, Nb, Ta, Sb, As, W and Mo may be contained in the form of oxides in an amount of 1% by weight or less for silicon oxide, 5% by weight or less for aluminum oxide, 5% by weight or less for gallium oxide, 3% by weight or less for indium oxide, 1% by weight or less for lithium oxide, 3% by weight or less for magnesium oxide, 3% by weight or less for manganese oxide, 3% by weight or less for nickel oxide, 5% by weight or less chromium oxide, 3% by weight or less for copper oxide, 3% by weight or less for titanium oxide, 3% by weight or less for zirconium oxide, 3% by weight or less for germanium oxide, 3% by weight or less for tin oxide, 3% by weight or less for vanadium oxide, 3% by weight or less for niobium oxide, 3% by weight or less for tantalum oxide, 3% by weight or less for antimony oxide, 3% by weight or less for arsenic oxide, 3% by weight or less for tungsten oxide, and 3% by weight or less for molybdenum oxide.

The ferrite particles of the invention contain the oxide magnetic material, and exhibit a coercive force higher than the conventional one even if the average grain diameter of the primary particles thereof exceeds 1 $\mu$m. The average grain diameter of the primary particles is preferably 2 $\mu$m or less, more preferably 1 $\mu$m or less, and especially preferably from 0.1 to 1 $\mu$m. When the average particle diameter is too large, the ratio of grains of polymagnetic domains in the magnet powder becomes large, and thus HcJ is lowered. When the average particle diameter is too small, the magnetism is lowered, or the orientation on molding in the presence of a magnetic field and the moldability are deteriorated.

The ferrite particles of the invention preferably has an intrinsic coercive force (HcJ) and its temperature dependency (Oe/° C.) satisfying the formula (III):

$|\Delta HcJ/\Delta T| \leq 5/3 \times HcJ - 7/3$       (III)

wherein an absolute value of the temperature dependency (Oe/° C.) of the intrinsic coercive force (HcJ) in the range of from −50 to 50° C. is expressed by $|\Delta HcJ/\Delta T|$, and the unit for HcJ is KOe.

The ferrite particles are generally used for a bonded magnet by binding them with a binder. As the binder, NBR rubber, a chlorinated polyethylene, nylon 12 (polyamide resin) and nylon 6 (polyamide resin) are generally used.

The Curie temperature of the oxide magnetic material of the above-described composition is generally from 400 to 480° C., especially from 425 to 460° C.

The process for producing the ferrite particles may be various methods including a solid phase reaction method, a liquid phase method, such as a coprecipitation method and a hydrothermal synthesis method, a glass precipitation method, an atomization thermal decomposition method, and a gas phase deposition method. Among these, the method that is most frequently employed for the industrial production of ferrite particles for a bonded magnet is the solid phase reaction method. Ferrite particles used for a coating type magnetic recording medium are mainly produced by the liquid phase method or the glass precipitation method.

In the solid phase reaction method, iron oxide powder, powder containing calcium, powder containing lanthanum and powder containing the element M are used, and the production is conducted by heating (calcining) a mixture of these species of powder. In the calcined body, the ferrite primary powder is agglomerated to be in the form of so-called granules. Therefore, pulverization is frequently conducted thereafter. The pulverization is conducted by a dry method or a wet method. The magnetic characteristics (mainly HcJ) of the ferrite particles are deteriorated on pulverization due to distortion introduced into the ferrite particles, and an annealing treatment is frequently conducted after pulverization.

In the case where a sheet-formed rubber magnet is produced, the ferrite particles must be oriented by a mechanical stress. In this case, the shape of the ferrite particles is preferably a plate form to obtain a high degree of orientation.

The following points are important when the ferrite particles are produced by the solid phase reaction method.
 (i) Agglomeration of the ferrite particles is prevented.
 (ii) Distortion of the ferrite particles is removed.
 (iii) In the case where the ferrite particles are mechanically oriented, the ferrite particles are made into a plate form.
 (iv) The size of the ferrite particles is arranged within an appropriate range.

In addition to the above-described raw material powder, $B_2O_3$ and other compounds, such as compounds containing Si, Al, Ga, In, Li, Mg, Mn, Ni, Cr, Cu, Ti, Zr, Ge, Sn, V, Nb, Ta, Sb, As, W and Mo, may be contained as an additive or an impurity, such as an unavoidable component.

The calcination may be conducted in the air, preferably in an atmosphere having an oxygen partial pressure exceeding 0.05 atm, particularly from 0.1 to 1.0 atm, at a temperature of from 1,000 to 1,350° C. for from 1 second to 10 hours, particularly from 1 second to 3 hours.

The resulting calcined body substantially has a magnetoplumbite ferrite structure, and the average particle diameter of the primary particle thereof is preferably 2 μm or less, more preferably 1 μm or less, further preferably from 0.1 to 1 μm, and especially preferably from 0.1 to 0.5 μm. The average diameter can be measured with a scanning electron microscope.

The calcined body is generally then pulverized or deflocculated to form powder of ferrite particles. The ferrite particles are mixed and kneaded with various binders, such as a resin, a metal and rubber, and molded in the presence of a magnetic field or the absence of a magnetic field. The molded body is then hardened depending on necessity to produce a bonded magnet.

The coating type magnetic recording medium can be produced in such a manner that the ferrite particles are mixed and kneaded with a binder to form a coating composition, and it is then coated on a substrate comprising a resin or the like, followed by hardening if necessary, to form a magnetic layer.

The sintered magnet of the invention comprises a primary phase of a hexagonal ferrite and has a composition of the above-described oxide magnetic material.

The sintered magnet is produced by molding the ferrite particles produced by the various processes described for the production process of the ferrite particles, and then sintered. In this case, the method using ferrite particles produced by the solid phase reaction method is most frequently employed in the industrial production, but ferrite particles produced by other processes may also be employed with no particular limitation.

Since the calcined body is generally in a form of granules, dry coarse pulverization is preferably conducted to pulverize or deflocculate the same. The dry coarse pulverization also has an effect in that crystalline distortion is introduced into the ferrite particles to reduce the coercive force HcB. By the reduction of the coercive force, agglomeration of the particles is suppressed to improve the dispersibility. The degree of orientation is also improved by suppressing agglomeration of the particles. The crystalline distortion introduced into the particles is relaxed in the subsequent sintering step, so that the coercive force is restored to make a permanent magnet. On the dry coarse pulverization, $SiO_2$ and $CaCO_3$, which is converted to CaO on sintering, are generally added. A part of $SiO_2$ may be added before calcination. Most of impurities and Si thus-added are segregated at grain boundaries and triple points, and a part thereof is incorporated into the ferrite part (primary phase).

After the dry coarse pulverization, a slurry for pulverization containing the ferrite powder and water, and wet pulverization is preferably conducted using the same.

After the wet pulverization, a slurry for molding is prepared by condensing the slurry for pulverization. The concentration may be conducted by centrifugation or filter press.

Molding can be conducted by either a dry process or a wet process, and it is preferred to use the wet process to obtain a high degree of orientation.

In the wet molding step, the slurry for molding is subjected to molding in the presence of a magnetic field. The molding pressure may be about from 0.1 to 0.5 ton/cm$^2$, and the magnetic filed applied may be about from 5 to 15 kOe.

In the wet molding, either a non-aqueous dispersing medium or an aqueous dispersing medium may be employed. In the case where a non-aqueous dispersing medium is used, a surface active agent, such as oleic acid, is added to an organic solvent, such as toluene and xylene, to form a dispersing medium, as described, for example, in Japanese Patent Application Kokai No. 6-53064. By using such a dispersing medium, a high degree of magnetic orientation of as high as 98% at most can be obtained even when ferrite particles of a submicron size is used, which are difficult to be dispersed. On the other hand, water having a surface active agent added thereto may be used as an aqueous dispersing medium.

After the molding step, the molded body is heat treated in the air or nitrogen at a temperature of from 100 to 500° C. to sufficiently remove the dispersant added. The molded body is sintered in the subsequent sintering step, for example, in the air, preferably in an atmosphere having an oxygen partial pressure exceeding 0.2 atm, particularly from 0.4 to 1.0 atm, preferably at a temperature of from 1,150 to 1,270° C., more preferably from 1,160 to 1,240° C., for about from 0.5 to 3 hours, to obtain an anisotropic ferrite sintered magnet.

The average crystal grain diameter of the sintered magnet of the invention is preferably 2 $\mu$m or less, more preferably 1 $\mu$m or less, and especially preferably from 0.5 to 1.0 $\mu$m. Even if the average crystal grain diameter exceeds 1 $\mu$m in the invention, a sufficiently high coercive force can be obtained. The crystal grain diameter can be measured with a scanning electron microscope. The specific resistivity is about $10^{-1}$ $\Omega$m or more.

The sintered magnet can also be obtained in such a manner that the molded body is pulverized by using a crusher and classified to have the average particle diameter of about from 100 to 700 $\mu$m by a sieve to obtain a magnetic orientation granules, which is then subjected to a dry molding in the presence of a magnetic field, and the resulting molded body is sintered.

The invention involves a magnetic recording medium comprising a thin film magnetic layer. The thin film magnetic layer has a hexagonal ferrite phase represented by formula (I) above as similar to the ferrite particles of the invention. The content of impurities is equivalent to the above-described oxide magnetic material.

The sputtering method is generally preferred for providing the thin film magnetic layer. In the case where the sputtering method is employed, the sintered magnet can be used as a target, or a multi-sputtering method using at least two kinds of oxide targets may be employed. After the film formation by the sputtering method, in some cases, it is subjected to a heat treatment to form the hexagonal magnetoplumbite structure.

By using the oxide magnetic material of the invention, the following effects can generally obtained and superior application products can be obtained. That is, in the case where the magnet of the invention has the same dimension as the conventional ferrite products, because the magnetic flux density generated from the magnet can be increased, it contributes to the provision of application products having higher performance, for example, a high torque can be obtained in the case of a motor, and a good sound quality with high linearity can be obtained due to the reinforcement of the magnetic circuit in the case of a speaker or a headphone. In the case where the same performance as the conventional magnet is enough, the size (thickness) of the magnet can be small (thin), and it contributes to make application products small-sized and lightweight (thin). Furthermore, in the motor using a wound type electromagnet as a magnet for a field system, the electromagnet can be replaced by the ferrite magnet to contribute to provision of the motor of lightweight and low cost, and the reduction in production process thereof. Furthermore, because the oxide magnetic material of the invention is excellent in temperature characteristics of the coercive force (HcJ), it can be used under the low temperature conditions, under which the conventional ferrite magnet involves a danger of low temperature demagnetization (permanent demagnetization), and thus the reliability of products used in cold areas and areas highly above the sea level can be considerably increased.

The bonded magnet and the sintered magnet using the oxide magnetic material of the invention are worked into prescribed shapes and are used in the wide range of applications described below.

The magnets of the invention can be preferably used as a motor for an automobile, such as for a fuel pump, a power window, an antilock brake system, a fan, a windshield wiper, a power steering, an active suspension system, a starter, a door lock system and an electric side mirror; a motor for an office automation and audio-visual apparatus, such as for an FDD spindle, a VTR capstan, a VTR rotation head, a VTR reel, a VTR loading system, a camcorder capstan, a camcorder rotation head, a camcorder zooming system, a camcorder focusing system, a capstan for a combination tape recorder and radio, a spindle for a compact disk player, a laser disk player and a minidisk player, a loading system for a compact disk player, a laser disk player and a minidisk player, and an optical pickup for a compact disk player and a laser disk player; a motor for a home electric apparatus, such as for an air compressor for a air conditioner, a compressor for a refrigerator, driving an electric tool, an electric fan, a fan for a microwave oven, a rotation system for a plate of a microwave oven, driving a mixer, a fan for a hair dryer, driving a shaver and an electric toothbrush; a motor for a factory automation, such as for driving an axis and a joint of an industrial robot, a main driver of an industrial robot, driving a table of a working apparatus, and driving a belt of a working apparatus; and a motor for other applications, such as for a generator of a motor bike, a magnet for a speaker and a headphone, a magnetron tube, a magnetic field generator for an MRI system, a clamper for a CD-ROM, a sensor of a distributor, a sensor of an antilock brake system, a level sensor for a fuel and an oil, and a magnet clutch.

EXAMPLE

Example 1

A Sintered Magnet Produced by Sintering a CaLaCo Ferrite (z=1) in the air or in Oxygen Raw materials were weighed and mixed, so that a mixture had a composition with a Ca/La/Co/Fe ratio of $Ca_{1-x1}La_{x1}Fe_{12-x1}Co_{x1}$, wherein x=y=0 to 1, and Z=1. The raw materials used were $\alpha$-$Fe_2O_3$ (for industrial use), $La_2O_3$ (99.9%), $CaCO_3$ and cobalt oxide (reagent, mixture of 85% of $Co_3O_4$ and 15% of CoO). At this time, $SiO_2$ (0.4% by weight) was simultaneously added. The weighed raw materials were mixed in a wet attritor, followed by drying. The resulting mixed powder was calcined with a batch furnace at 1,200° C. for 3 hours in the air.

To the calcined powder, $SiO_2$ (0.4% by weight), $CaCO_3$ (1.25% by weight) and 1 ml of ethanol were added, and the mixture was pulverized with a dry vibration rod mill for 20 minutes. To the pulverized powder, 1.3% by weight of oleic acid was added, and the mixture was pulverized in xylene with a ball mill for 40 hours. The resulting slurry was adjusted to have a slurry concentration of about 85% by a centrifugal separator. The slurry was subjected to wet press (pressing pressure: 0.4 ton/cm$^2$) in the presence of a magnetic field of about 10 kOe, to prepare a cylindrical sample of 30 mm in diameter×15 mm in height. The resulting molded body was sintered at a sintering temperature $T_2$ of 1,220° C. for 1 hour in the air or oxygen, to prepare samples. The resulting samples were measured for the magnetic characteristics (Br and HcJ) with respect to the composition. The results obtained are shown in FIG. 1.

Figure 1B:
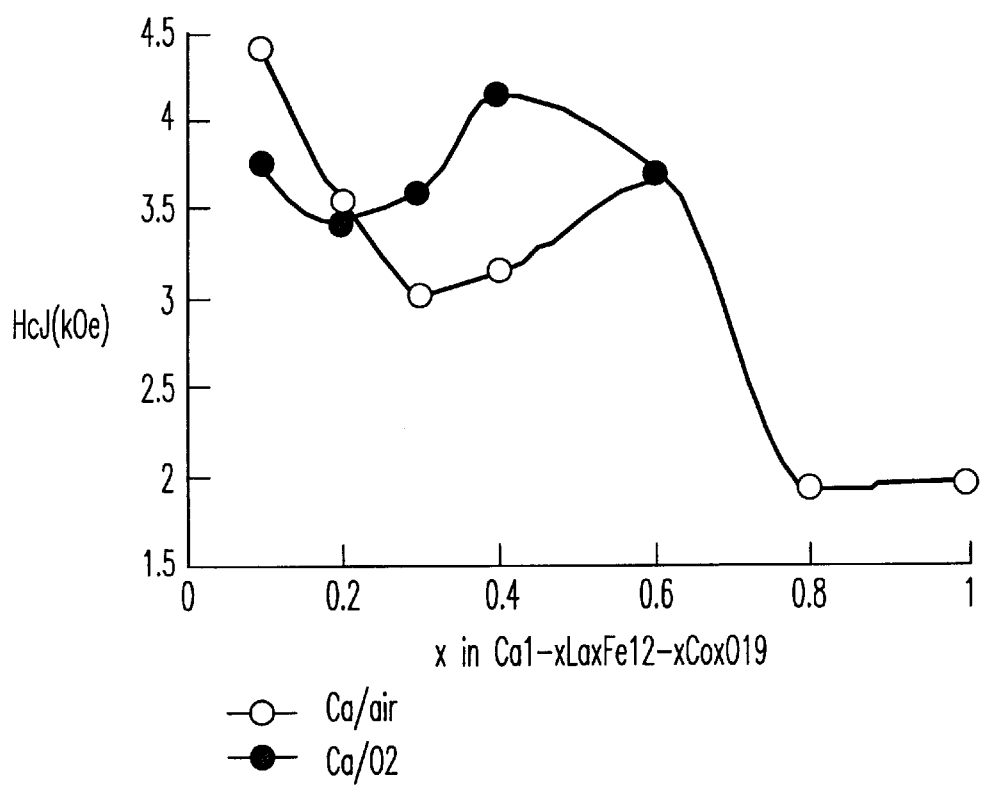

It is clear from FIG. 1 that in the case of a Ca series ferrite, Br and HcJ increased within the range of x=y=0.4 to 0.6. As there was a great difference between the sample sintered in the air and the sample sintered in oxygen, the sample sintered in the air had a HcJ value of 3.1 kOe when x=y=0.4, whereas the sample sintered in oxygen had a greatly increased HcJ value of 4.2 kOe.

Example 2

A sintered magnet produced by Sintering a CaLaCo Ferrite with the z Value Deviated (z=0.85 or 0.95)

Figure 2:
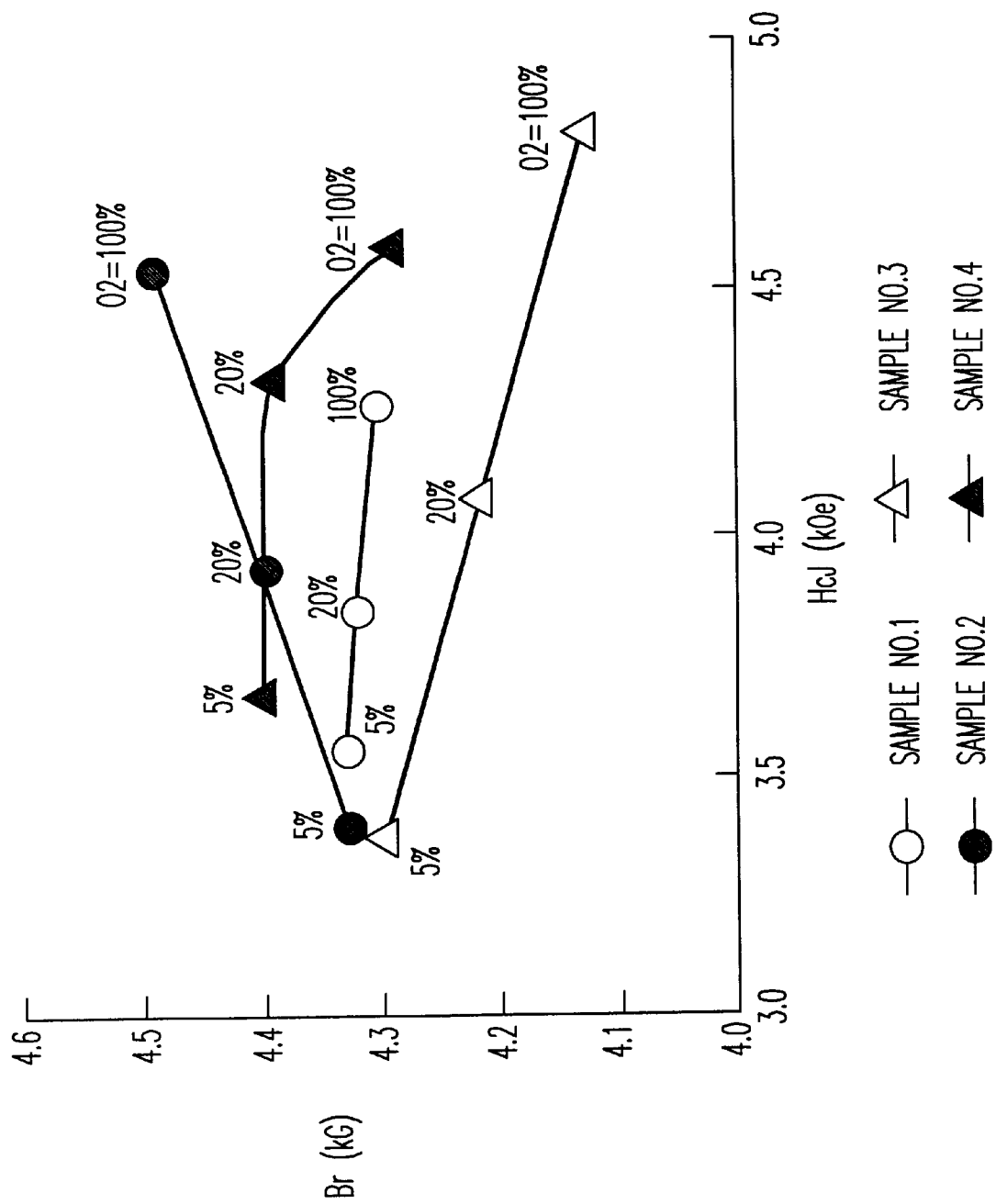
FIG. 2 is a graph showing the magnetic characteristics of the sintered body obtained at a sintering temperature of 1,220° C. with varying the sintering atmosphere.

Samples of sintered bodies were produced in the same manner as in Example 1 except that the calcining temperature was 1200° C. and the compositions and the addition conditions shown in Table 1 were employed. The magnetic characteristics of the sintered bodies with the sintering temperature of 1,220° C. and in various sintering atmospheres are shown in FIG. 2. The magnetic characteristics of Sample No. 2 in Table 1 where the sintering temperature is 100% oxygen and the sintering temperature is varied from 1,200 to 1,240° C. are shown in Table 2.

TABLE 1

| Sample No. | z | Ca mol | La mol | Fe mol | Co mol | $SiO_2$ wt % | $CaCO_3$ wt % |
|---|---|---|---|---|---|---|---|
| 1 | 0.85 | 0.5 | 0.5 | 9.77 | 0.43 | 0.6 | — |
| 2 | 0.85 | 0.5 | 0.5 | 9.77 | 0.43 | 0.6 | 1.0 |
| 3 | 0.95 | 0.5 | 0.5 | 10.93 | 0.475 | 0.6 | 1.0 |
| 4 | 0.95 | 0.5 | 0.5 | 10.93 | 0.475 | 0.6 | 1.5 |

TABLE 2

| Sample No. | T2 (° C.) | Br (kG) | HcJ (kOe) | 4πIs (kG) | Ir/Is (%) | Hk/HcJ (%) | df (g/cm³) |
|---|---|---|---|---|---|---|---|
| 21 | 1200 | 4.42 | 4.53 | 4.55 | 97.0 | 75.9 | 5.05 |
| 22 | 1220 | 4.49 | 4.54 | 4.60 | 97.6 | 80.6 | 5.08 |
| 23 | 1240 | 4.42 | 4.24 | 4.58 | 96.5 | 77.4 | 5.10 |

It is clear from FIG. 2 that Sample No. 2 (z=0.85,1% by weight of $CaCO_3$ was added after the calcination) sintered in oxygen exhibited superior characteristics (Br of 4.5 kG and HcJ of 4.5 kOe) equivalent to an SrLaCo series ferrite. Furthermore, it was clear from Table 2 that when the sintering atmosphere was oxygen 100%, the highest characteristics could be obtained at a sintering temperature of 1,220° C.

Example 3

The Calcined Material and the Pulverized Material Observed with an SEM

Figure 3:
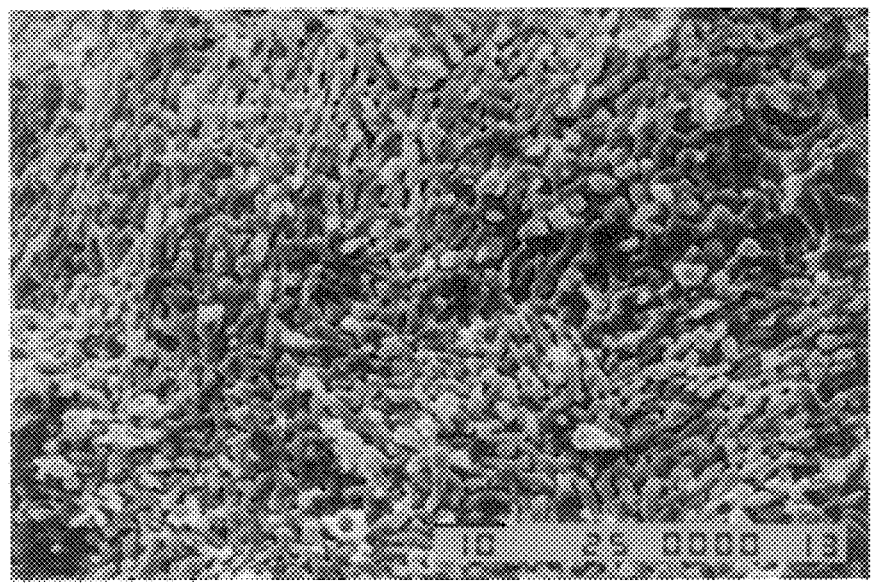
FIG. 3 is an SEM photograph of the surface of the calcined grains of the calcined material at 1,250° C. having a composition of x=y=0.5 and z=0.85.
Figure 4:
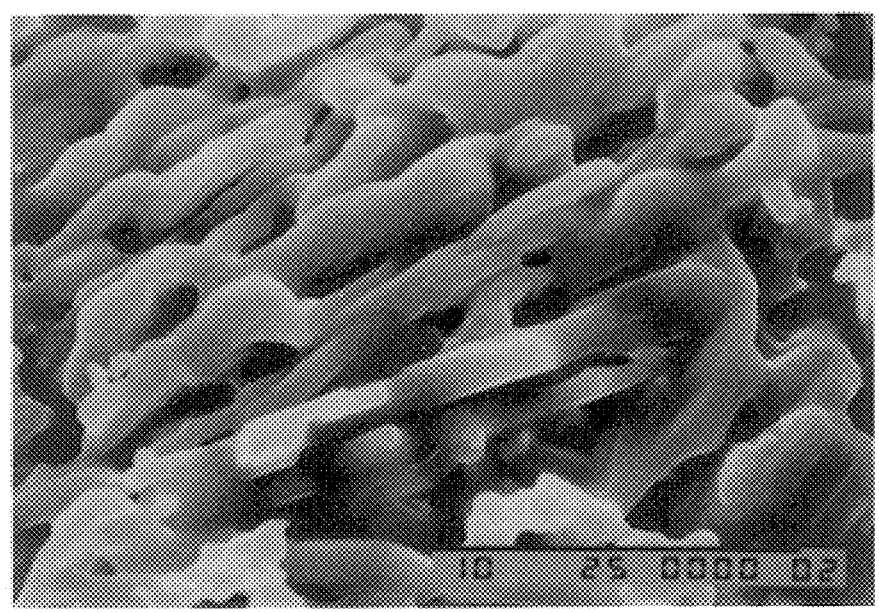
FIG. 4 is an enlarged photograph of the SEM photograph of FIG. 3.
Figure 5:
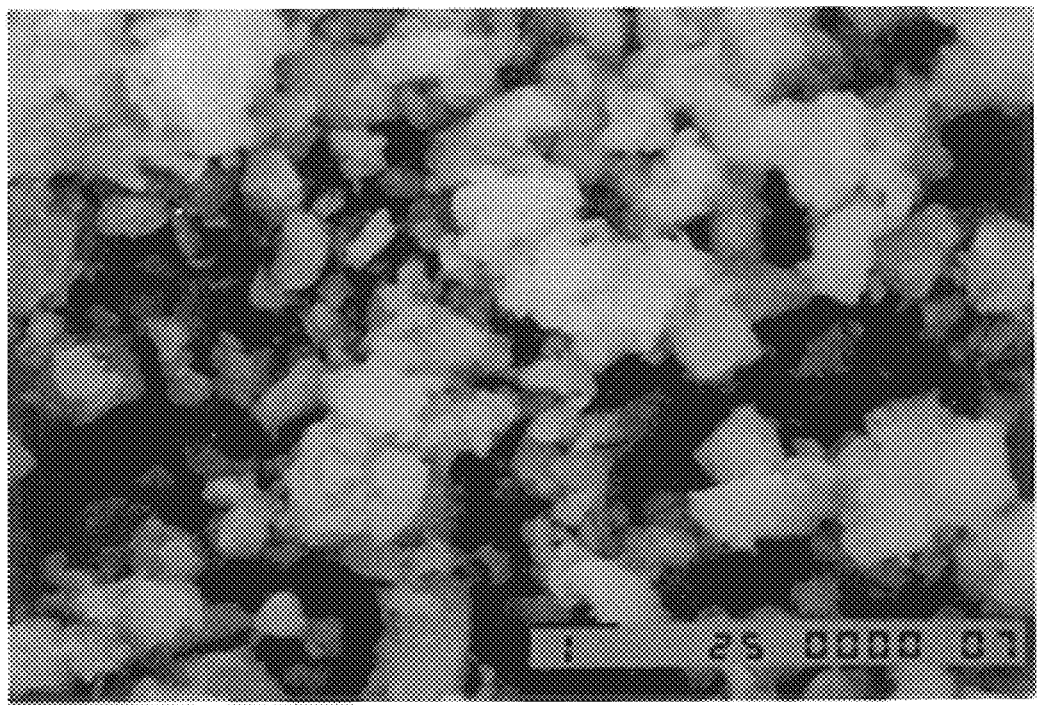
FIG. 5 is an SEM photograph of the powder pulverized with a ball mill of the calcined material at 1,250° C. having a composition of x=y=0.5 and z=0.85.

The calcined material of x=y=0.5 and z=0.85 calcined at 1,250° C. and its pulverized material pulverized with a ball mill were observed with an SEM. The resulting photographs are shown in FIGS. 3 to 5. FIG. 3 is a photograph of the surface of the calcined material grains, FIG. 4 is an enlarged photograph of FIG. 3, and FIG. 5 is a photograph of the powder pulverized with a ball mill for 40 hours. It was clear from FIGS. 3 and 4 that the primary particles of the calcined material were plate-like crystals having an extremely large aspect ratio having a thickness of 1 μm and a grain diameter of from 3 to 10 μm. Furthermore, an extremely unique state was observed in that the particles were oriented within the region having a width of from 10 to 20 μm. It was clear from FIG. 5 that the powder after pulverization with a ball mill had a size of about 1 μm or less.

Example 4

Measurement for σ-T Characteristics of a Sample of a Sintered Body of x=y=0.5 and z=0.85 Sintered at 1,220° C. in Oxygen A sample of a sintered body of x=y=0.5 and z=0.85 sintered at 1,220° C. in oxygen was measured for σ-T characteristics. The results obtained are shown in FIG. 6.

Figure 6:
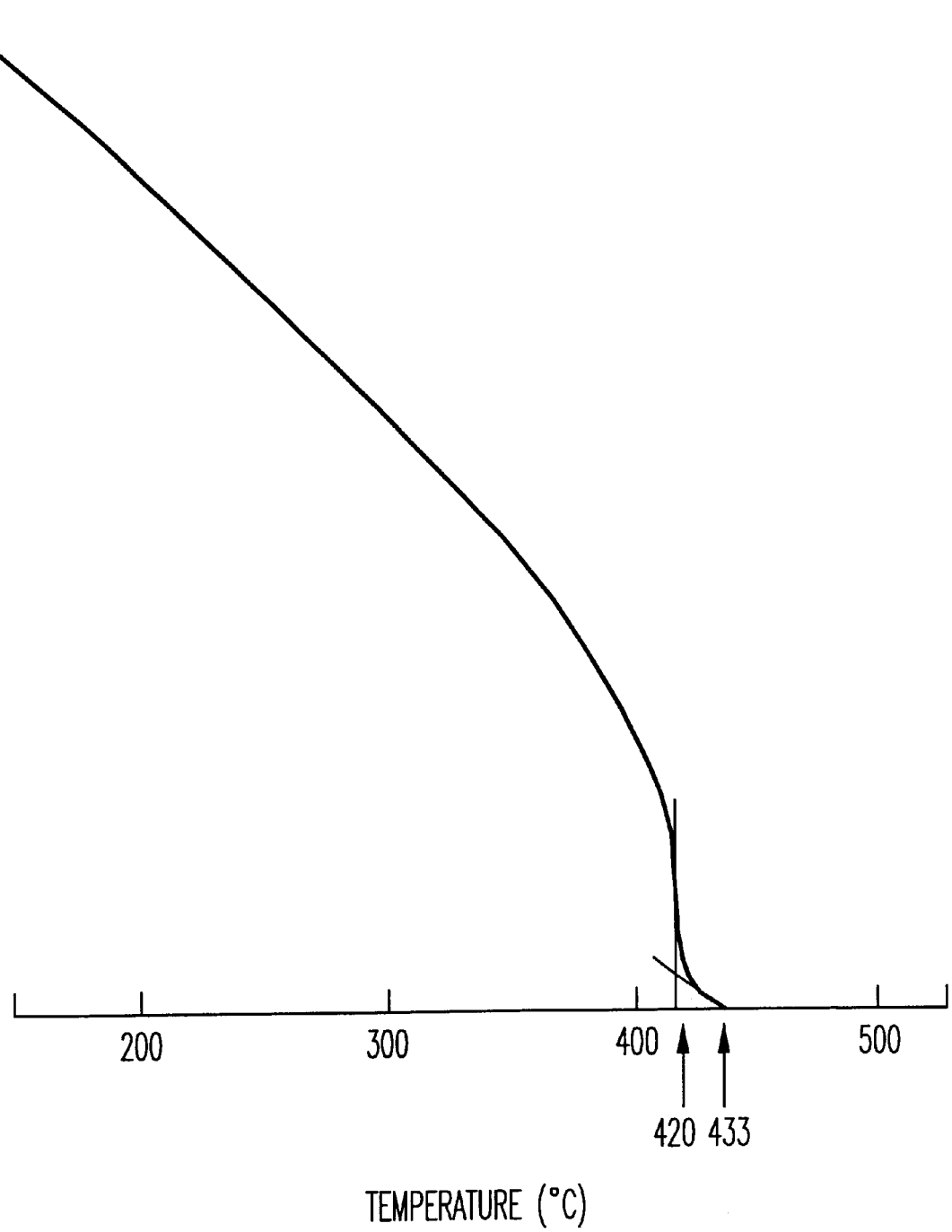
FIG. 6 is a graph showing the σ-T characteristics of the sample sintered in oxygen at 1,220° C. with a composition of x=y=0.5 and z=0.85.

It is clear from FIG. 6 that the Curie temperature Tc was about 420° C., and the magnetization disappeared at 433° C. The temperature coefficient of σ from room temperature (25° C.) to +125° C. was −0.194%/° C., which was the same as the M type Sr ferrite having the conventional composition.

Example 5

Figure 7:
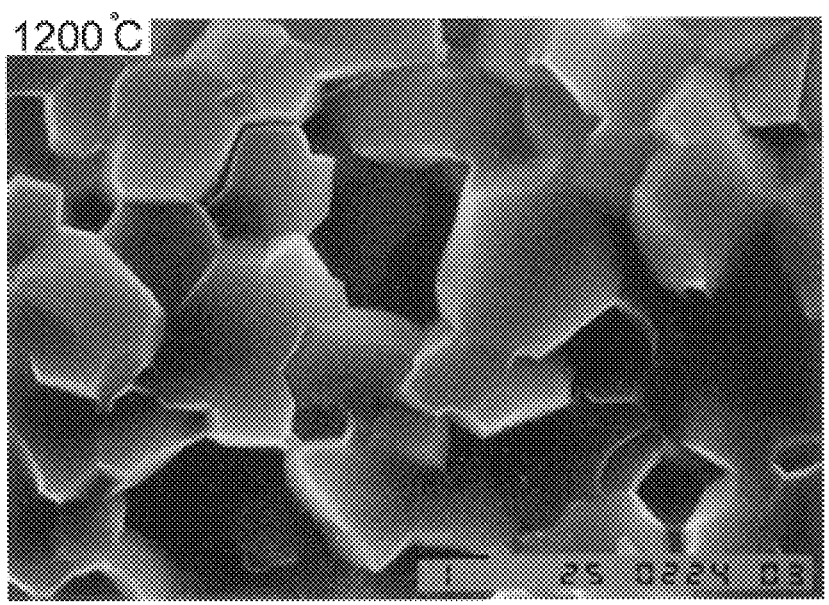
FIG. 7 is an SEM photograph of the c plane of the sample sintered in oxygen at 1,200° C. with a composition of x=y=0.5 and z=0.85.
Figure 8:
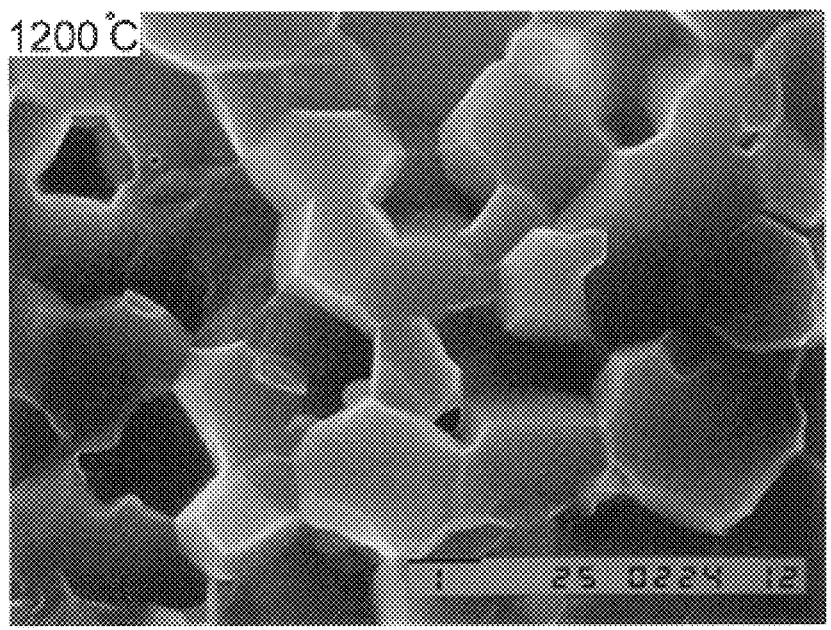
FIG. 8 is an SEM photograph of the c plane of the sample sintered in oxygen at 1,220° C. with a composition of x=y=0.5 and z=0.85.
Figure 9:
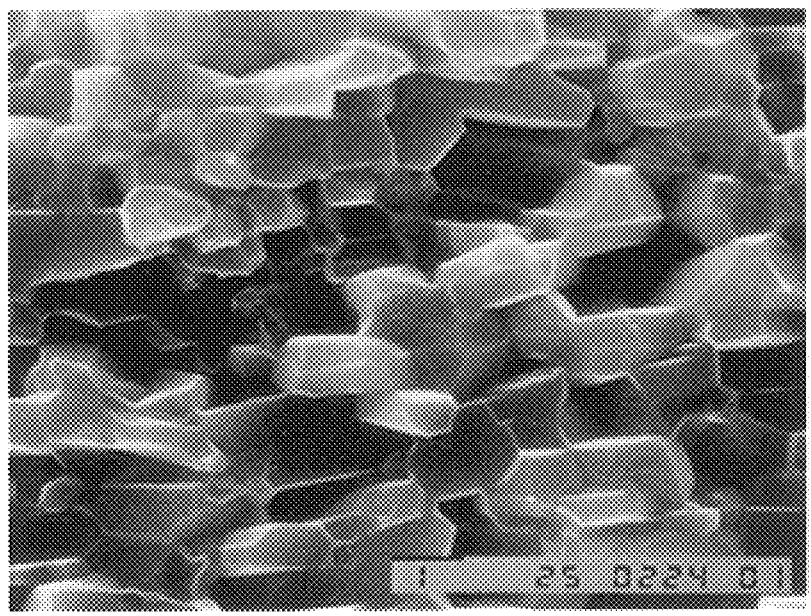
FIG. 9 is an SEM photograph of the a plane of the sample sintered in oxygen at 1,200° C. with a composition of x=y=0.5 and z=0.85.
Figure 10:
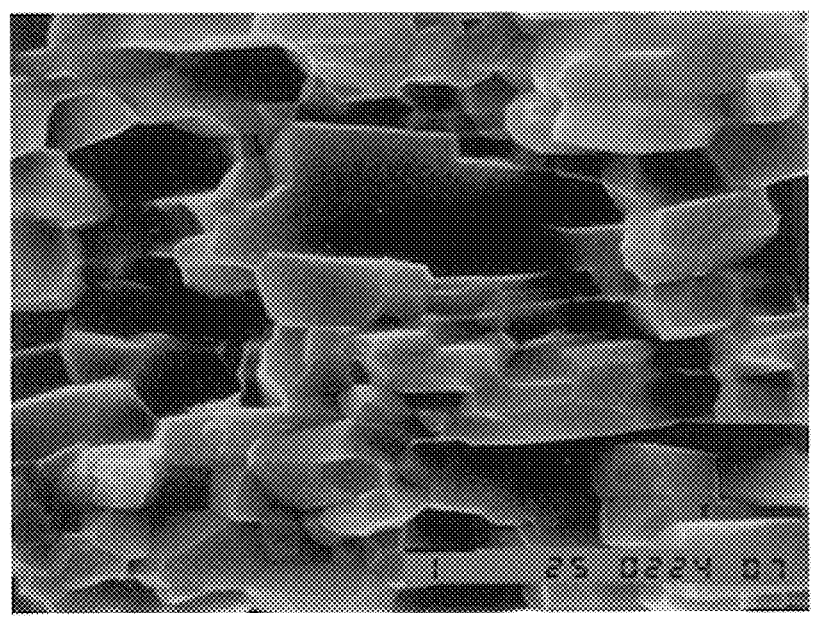
FIG. 10 is an SEM photograph of the a plane of the sample sintered in oxygen at 1,220° C. with a composition of x=y=0.5 and z=0.85.

The Structure of a Sintered Body of x=y=0.5 and z=0.85 Sintered at 1,200° C. or 1,220° C. in Oxygen The c plane and the a plane of a sample sintered at 1,200° C. or 1,220° C. in oxygen with a composition of x=y=0.5 and z=0.85 were observed with an SEM. The resulting photographs are shown in FIGS. 7 to 10. FIG. 7 shows the c plane of the sample sintered in oxygen at 1,200° C., FIG. 8 shows the c plane of the sample sintered in oxygen at 1,220° C., FIG. 9 shows the a plane of the sample sintered in oxygen at 1,200° C., and FIG. 10 shows the a plane of the sample sintered in oxygen at 1,220° C.

It is clear from FIGS. 7 to 10 that many relatively large grains of from 2 to 3 μm are present, and the aspect ratio is as large as 2 or more. Even though it contains such many large grains, an HcJ value of 4.2 kOe or more is obtained, and it is thus expected that the ferrite of the invention has a considerably large crystal magnetic anisotropy.

Example 6

Measurement of The Anisotropic Magnetic Field ($H_A$) of a Sintered Body of x=y=0.5 and z=0.85 Sintered at 1,240° C. in Oxygen A composition of x=y=0.5 and z=0.85 was sintered at 1,240° C. in oxygen to obtain a sintered body. The sintered body was worked into a cube having a length of the side of about 12 mm, followed by subjecting to annealing in the air at 1,000° C. to obtain a sample. The magnetization curves of the a axis direction and the c axis direction of the sample were measured. The anisotropic magnetic field $H_A$ was obtained therefrom, and it was found that $H_A$ was 20.6 kOe. This is a value higher by about 10% than the value of from 18 to 19 kOe for the conventional SrM type ferrite.

Example 7

The Temperature Characteristics of HcJ of a Sintered Body of x=y=0.5 and z=0.85 Sintered at 1,220° C. in Oxygen A sample of a sintered body was obtained by sintering a composition of x=y=0.5 and z=0.85 at 1,220° C. in oxygen. The sample was measured for an I-H hysteresis within the range of from −196° C. to +143° C. by a VSM (vibration sample magnetomator). As a result, the HcJ changed only by 0.3 kOe within this temperature range, and it was thus found that the sample had superior temperature characteristics of HcJ. At this time, HcJ at 25° C. was 4.5 kOe.

Example 8

Examination of The CaRCo Series Composition (R: La, Ce, Pr, Nd, Sm, Gd, Tb or Y) and its Calcined Powder The raw materials were mixed in the same manner as in Example 1 except that the composition was $Ca_{0.5}R_{0.5}Fe_{10}Co_{0.5}$ (R was La, Ce, Pr, Nd, Sm, Gd, Tb or Y, provided that when R was Ce, the composition was $Ca_{0.75}R_{0.25}Fe_{10}Co_{0.5}$), and calcination was conducted in the air at a temperature of from 1,000 to 1,300° C. for 1 hour. The resulting calcined material was evaluated for magnetic characteristics with a VSM. The values of σs (emu/g) of the calcined powder are shown in Table 3.

TABLE 3

Relation between calcination temperature and the saturation magnetization (emu/g) of the ferrite grains for each R elements

| R | Calcination temperature (° C.) | | | | | |
|---|---|---|---|---|---|---|
|  | 1000 | 1100 | 1150 | 1200 | 1250 | 1300 |
| La | 12.6 | 8.9 | 52.1 | 64.3 | 65.5 | 65.7 |
| Ce | 11.8 | 8.7 | 8.3 | 8.3 | 10.5 | 12.5 |
| Pr | 11.9 | 10.8 | 9.0 | 9.0 | 9.8 | 11.0 |
| Nd | 13.3 | 14.1 | 9.2 | 8.9 | 9.3 | 10.5 |
| Sm | 13.6 | 15.3 | 16.1 | 17.3 | 13.0 | 13.8 |
| Y | 14.8 | 17.0 | 18.6 | 19.0 | 19.5 | 20.0 |
| Gd | 14.2 | 14.1 | 15.4 | 16.6 | 17.1 | 11.3 |
| Tb | 14.6 | 14.4 | 15.8 | 17.2 | 17.5 | 16.9 |

It is clear from Table 3 that only in the case where R was La, a high σs was obtained at a calcination temperature of 1,150° C. or higher. This is because in the systems other than containing La, α-$Fe_2O_3$ and an orthogonal ferrite are liable to be formed and the growing rate of the M phase is low.

Example 9

Figure 11:
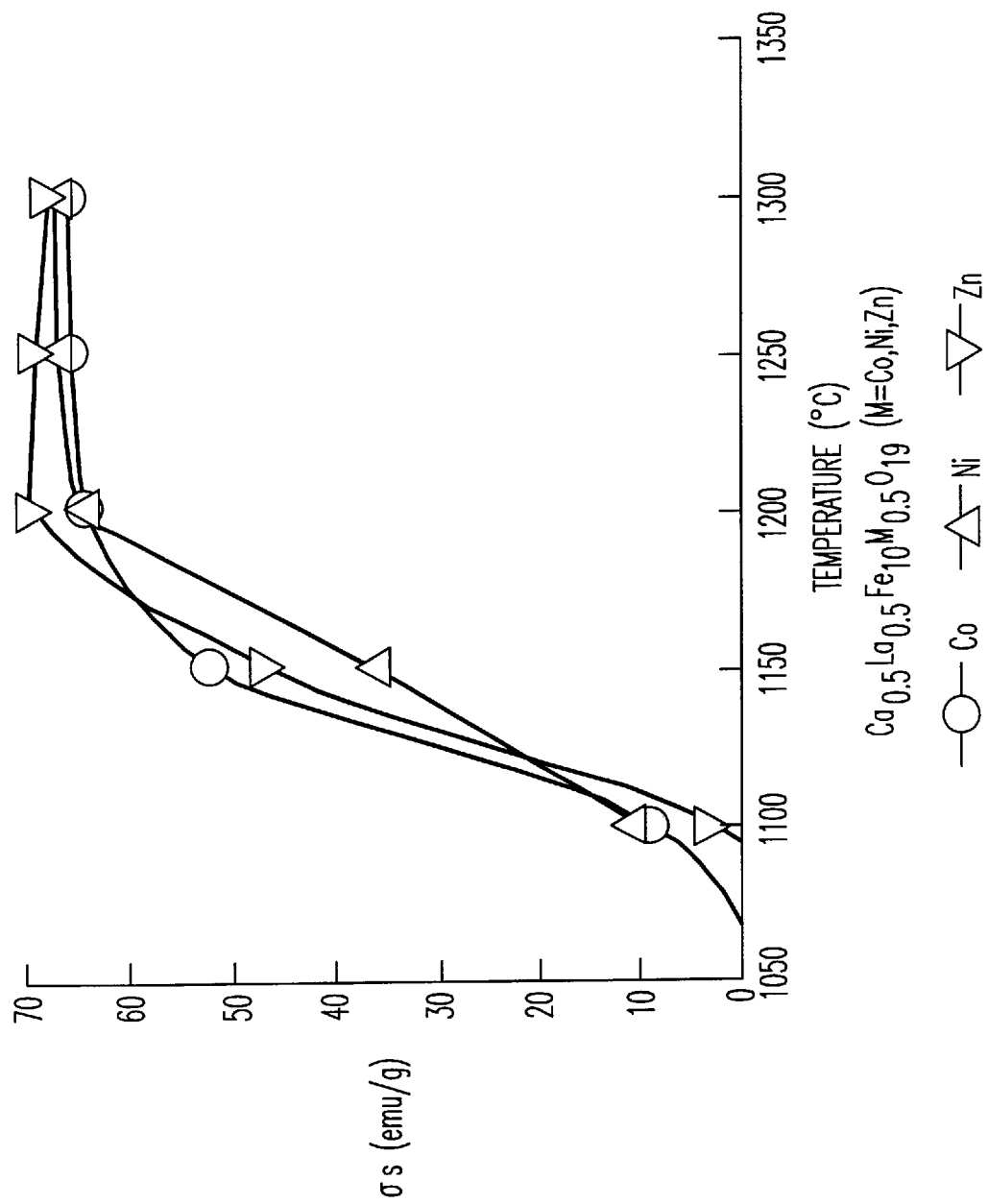
FIG. 11 is a graph showing cs of the calcined body of $Ca_{0.5}La_{0.5}Fe_{10}M_{0.5}$ (M=Co, Ni or Zn).

Examination of The CaLaM Series Composition (M: Co, Ni or Zn) and its Calcined Powder and Sintered Body Sintered bodies were produced in the same manner as in Example 1 except that the composition was $Ca_{0.5}La_{0.5}Fe_{10}M_{0.5}$ (M was Co, Ni or Zn), which were then evaluated for magnetic characteristics. FIG. 11 shows σs of the powder after calcination.

It is understood from FIG. 11 that a σs value of 60 emu/g or more is obtained at a calcination temperature of 1,200° C. or more.

Pulverized powder pulverized with a dry rod mill was subjected to an annealing treatment in the air at a temperature of from 900 to 1,100° C., and was evaluated for magnetic characteristics with a VSM. The results obtained are shown in Table 4. The magnetic characteristics of the sintered bodies are shown in Table 5.

TABLE 4

Annealing temperatures and magnetic characteristics (σs and HcJ) of ferrite grains for each M elements

| M | Annealing temperature (° C.) | σs (emu/g) | HcJ (kOe) | ΔHcJ/ΔT (Oe/° C.) |
|---|---|---|---|---|
| Co | — | 57.4 | 1.69 | −1.7 |
| Co | 1000 | 56.3 | 4.28 | −2.0 |
| Co | 1100 | 61.0 | 4.48 | — |
| Ni | — | 56.4 | 1.03 | 0.6 |
| Ni | 1000 | 56.6 | 2.79 | 0.6 |
| Ni | 1100 | 61.6 | 2.73 | — |
| Zn | — | 60.4 | 1.00 | 1.5 |
| Zn | 1000 | 63.5 | 2.67 | 3.6 |
| Zn | 1100 | 69.3 | 2.41 | — |

TABLE 5

Magnetic characteristics of the sintered bodies for each M elements

| M | Sintering temperature (° C.) | Oxygen partial pressure (atm) | Br (kG) | HcJ (kOe) | ΔHcJ/ΔT (Oe/° C.) |
|---|---|---|---|---|---|
| Co | 1220 | 0.05 | 4.35 | 3.67 | — |
| Co | 1220 | 1.0 | 4.43 | 4.20 | 1.4 |
| Ni | 1220 | 0.05 | 4.14 | 1.54 | — |
| Ni | 1220 | 1.0 | 4.26 | 1.63 | 5.7 |
| Zn | 1220 | 0.05 | 4.34 | 1.07 | — |
| Zn | 1220 | 1.0 | 4.44 | 1.01 | 7.3 |

It is clear from Tables 4 and 5 that the ferrite magnets of the invention are particularly excellent in temperature characteristics of HcJ.

Example 10

Sintered bodies were produced in the same manner as in Example 1 except that the composition was $Ca_{1-x1}La_{x1}Fe_{12-x1}Co_{x1}$, wherein x1 was 0, 0.1, 0.2, 0.3, 0.4, 0.6, 0.8 or 1.0. The sintering temperature was 1,200° C.

Figure 12:
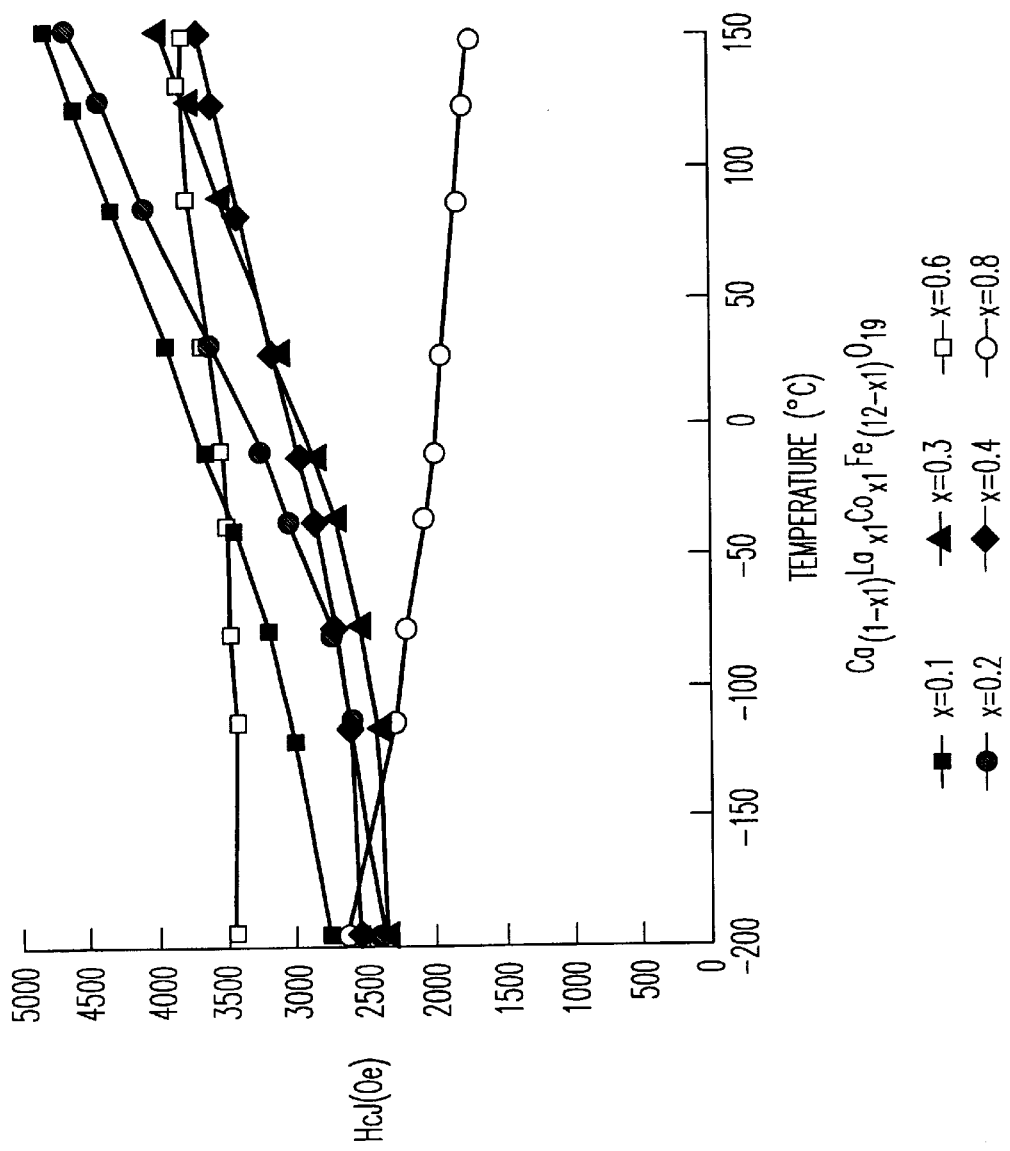
FIG. 12 is a graph showing the temperature dependency of the substitution ratio (x1) of La and Co and the coercive force for the Ca ferrite sintered body.

The temperature dependency of HcJ is shown in FIG. 12. The change of HcJ depending on the temperature disappeared when x1 was 0.6.

Figure 13A:
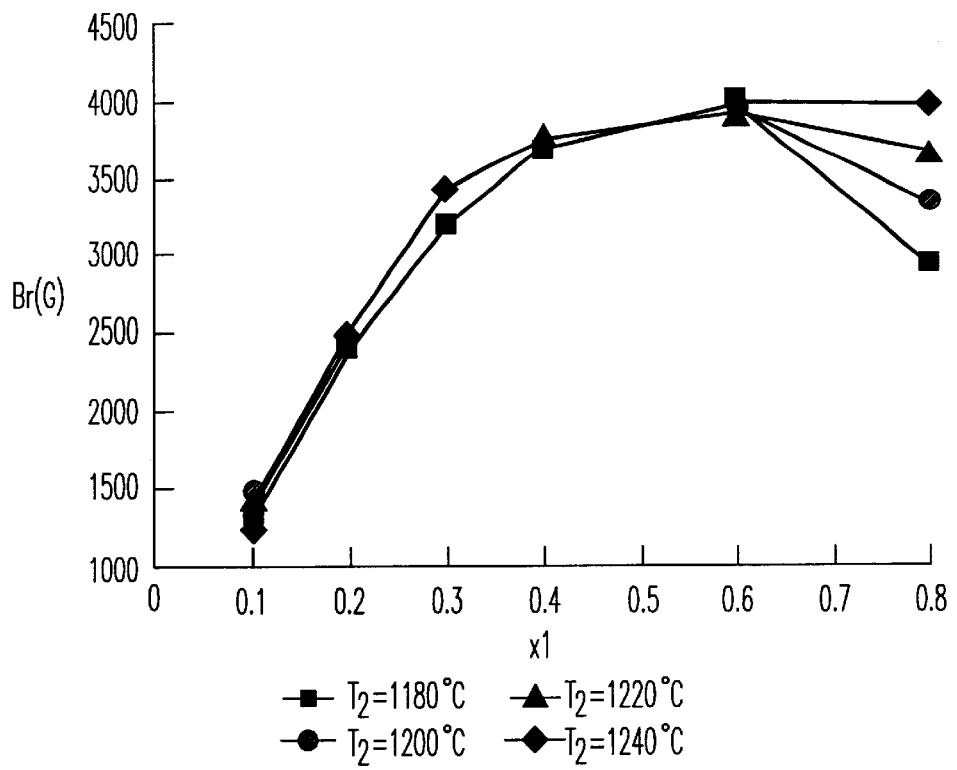
FIG. 13 is a graph showing the relationship between the substitution degree (x1) of La and Co and the magnetic characteristics for the Ca ferrite sintered body.
Figure 13B:
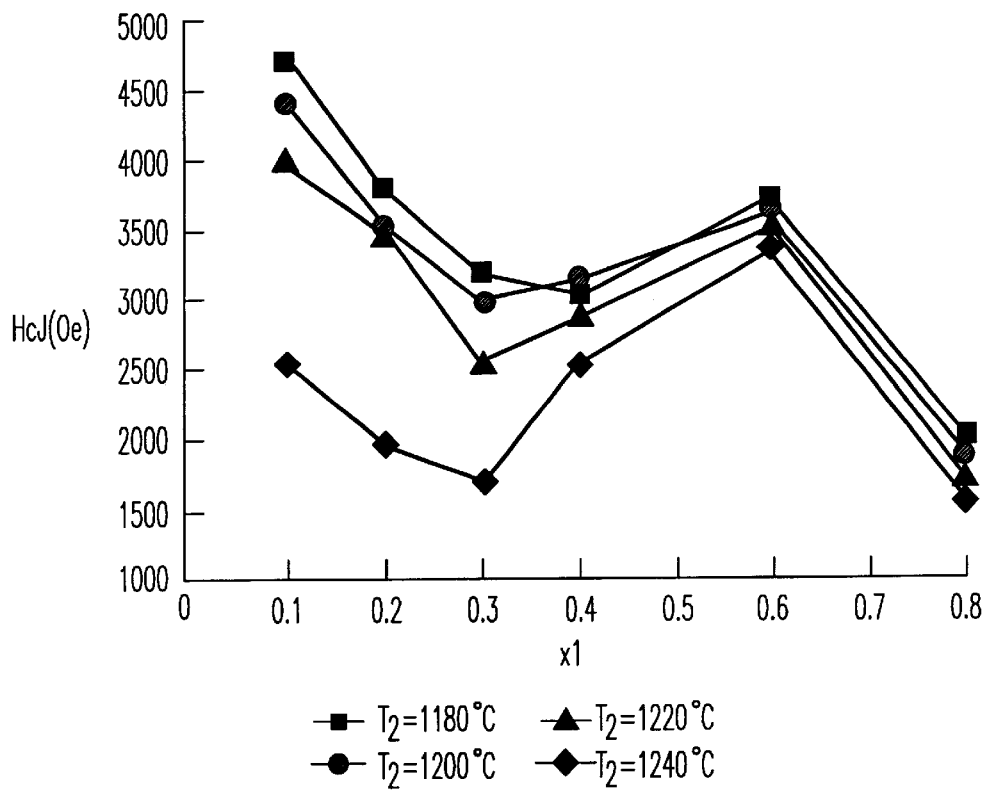
Figure 14A:
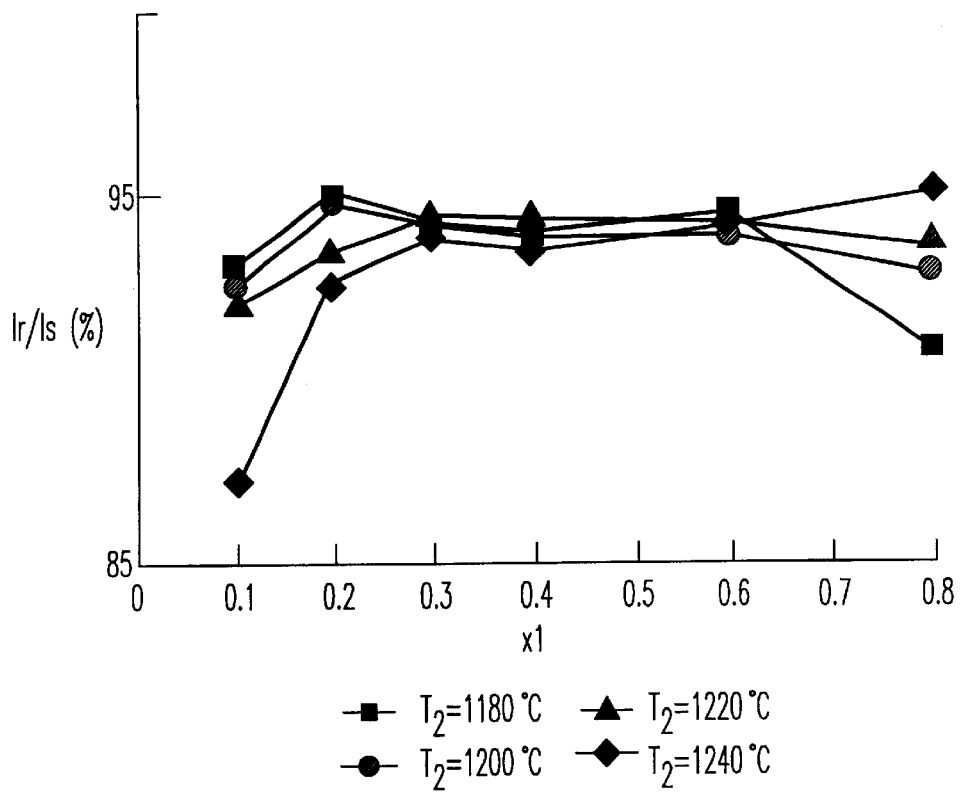
FIG. 14 is a graph showing the relationship between the substitution degree (x1) of La and Co and the magnetic characteristics for the Ca ferrite sintered body.
Figure 14B:
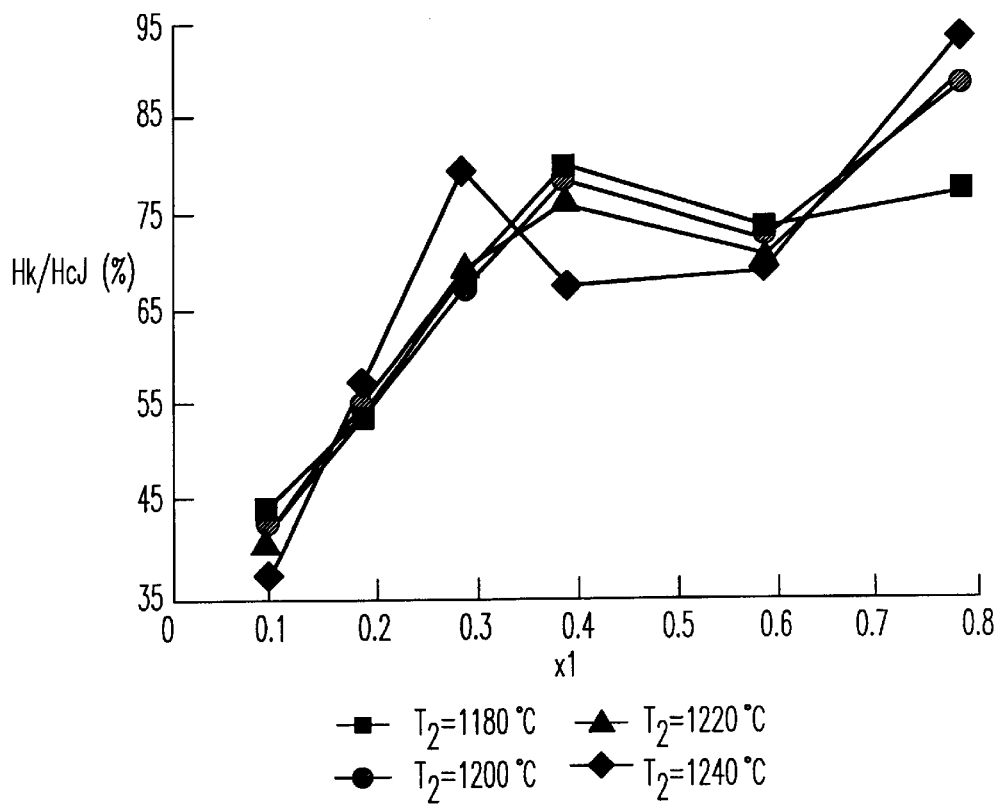

The composition dependencies of the coercive force (HcJ) and Br are shown in FIG. 13, and the composition dependencies of the degree of magnetic orientation (Ir/Is) and the squareness (Hk/HcJ) are shown in FIG. 14. When x was 0.6, Br was about 4 kG and HcJ was a value of 3 kOe or more.

Example 11

Sintered bodies were produced in the same manner as in Example 10 except that the composition was $Sr_{0.4-x2}Ca_{x2}La_{0.6}Co_{0.6}Fe_{11.4}$, wherein x2 was 0, 0.2 or 0.4.

Figure 15A:
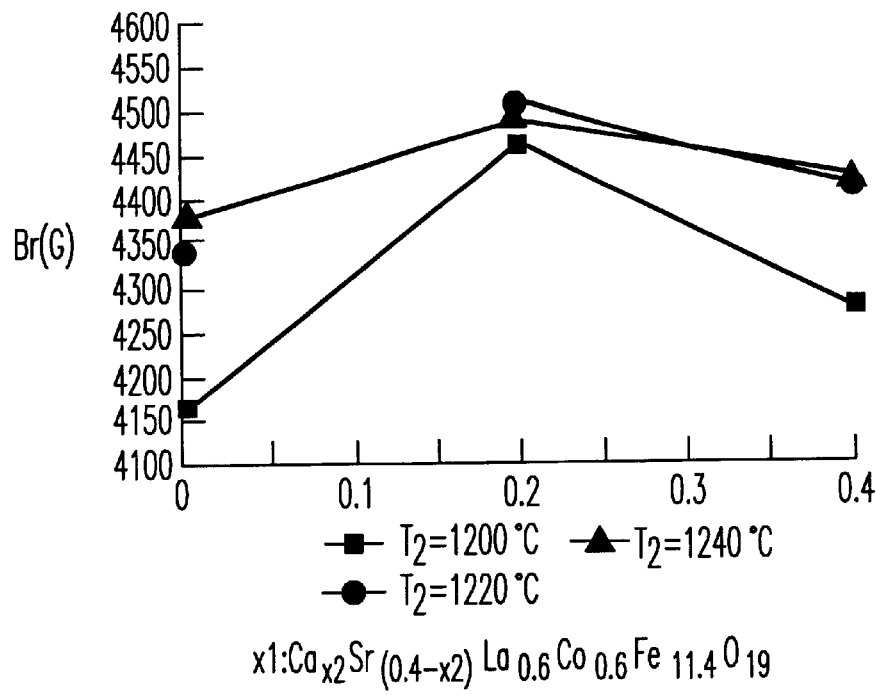
FIG. 15 is a graph showing the relationship between the substitution degree (x2) of Ca and the magnetic characteristics for the SrCa ferrite sintered body.
Figure 15B:
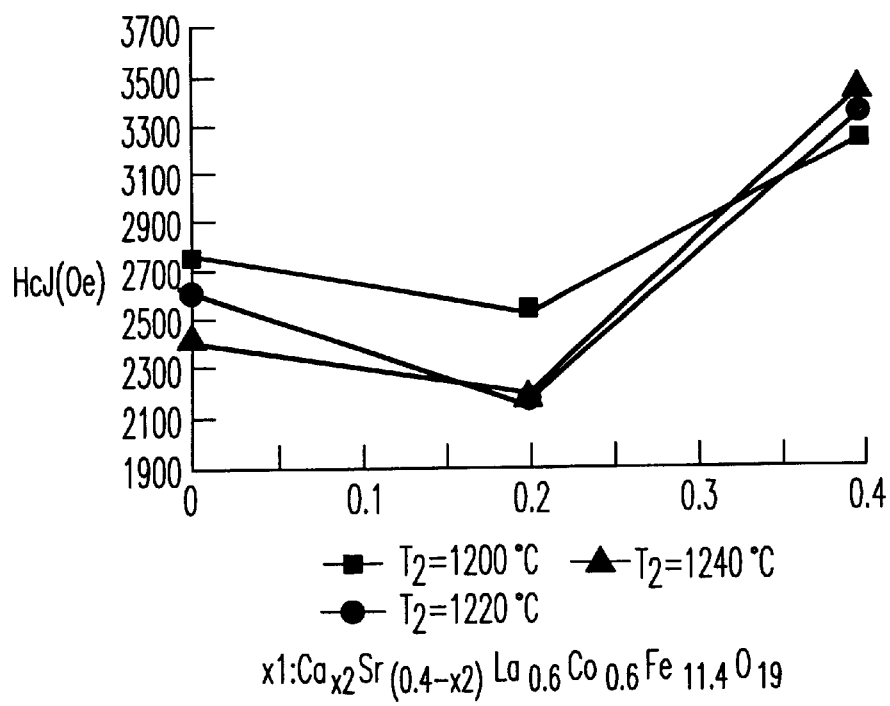
Figure 15C:
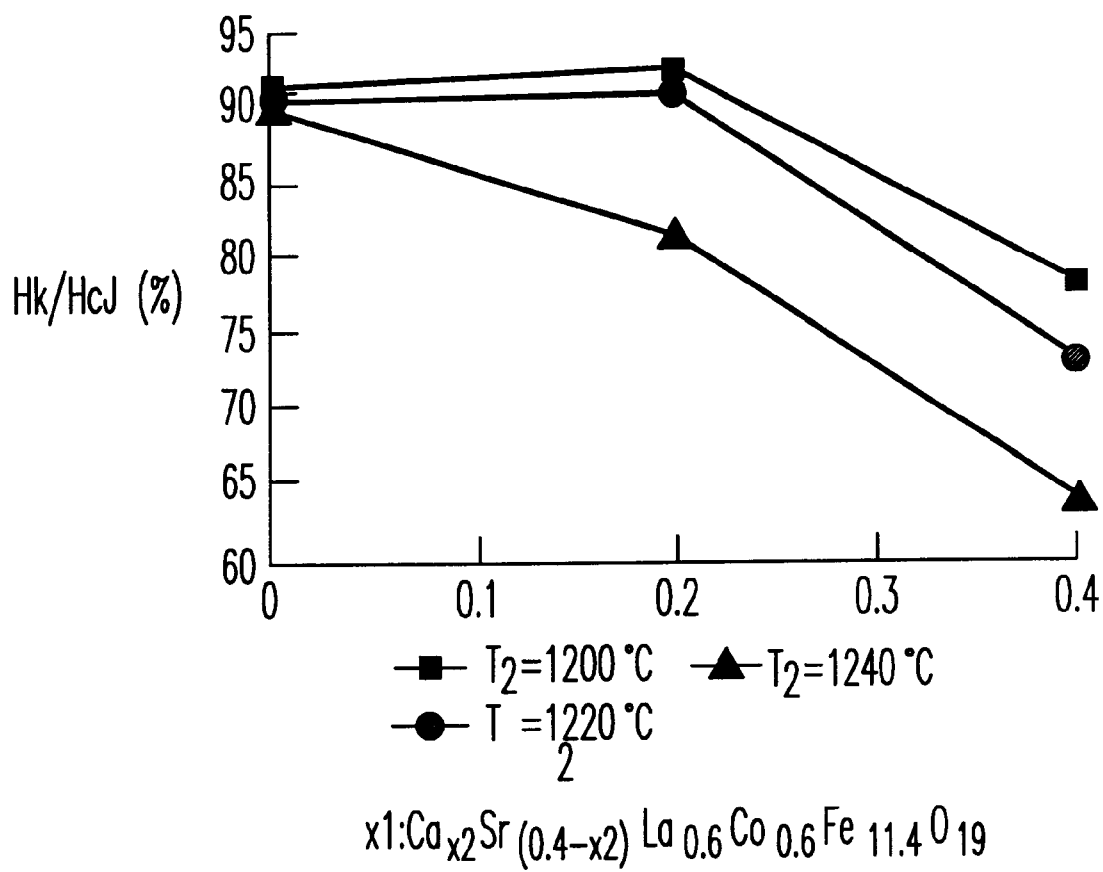
Figure 16A:
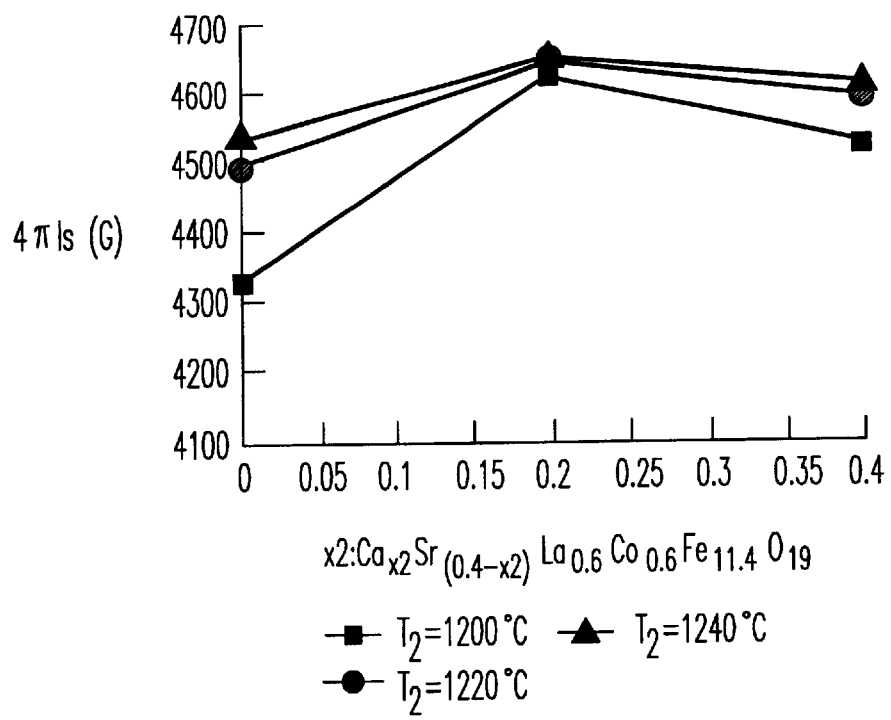
FIG. 16 is a graph showing the relationship between the substitution degree (x2) of Ca and the magnetic characteristics for the SrCa ferrite sintered body.
Figure 16B:
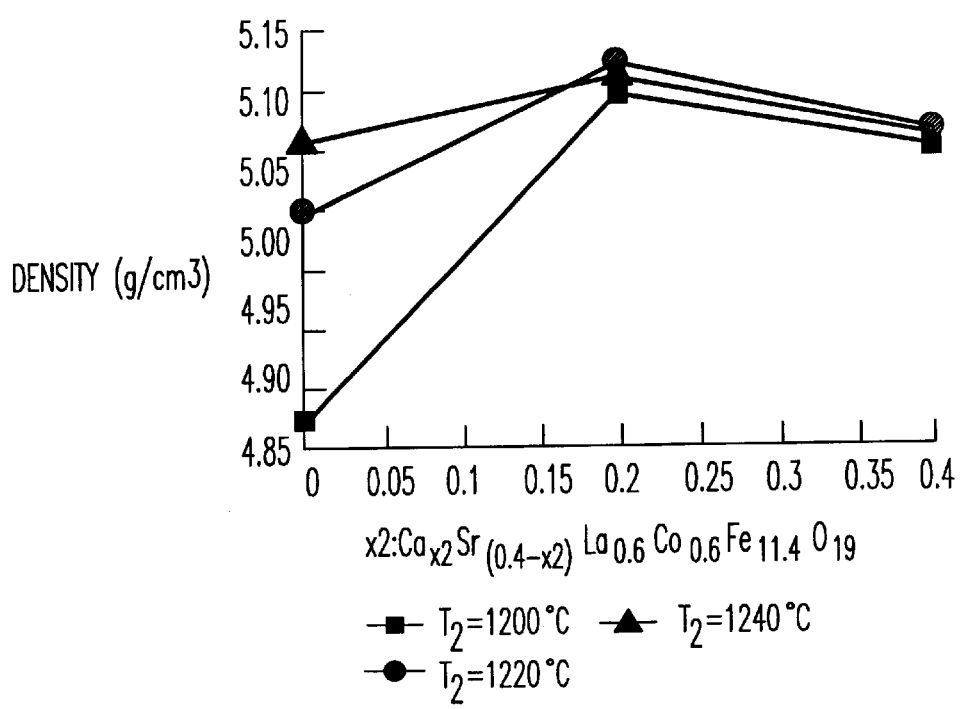
Figure 16C:
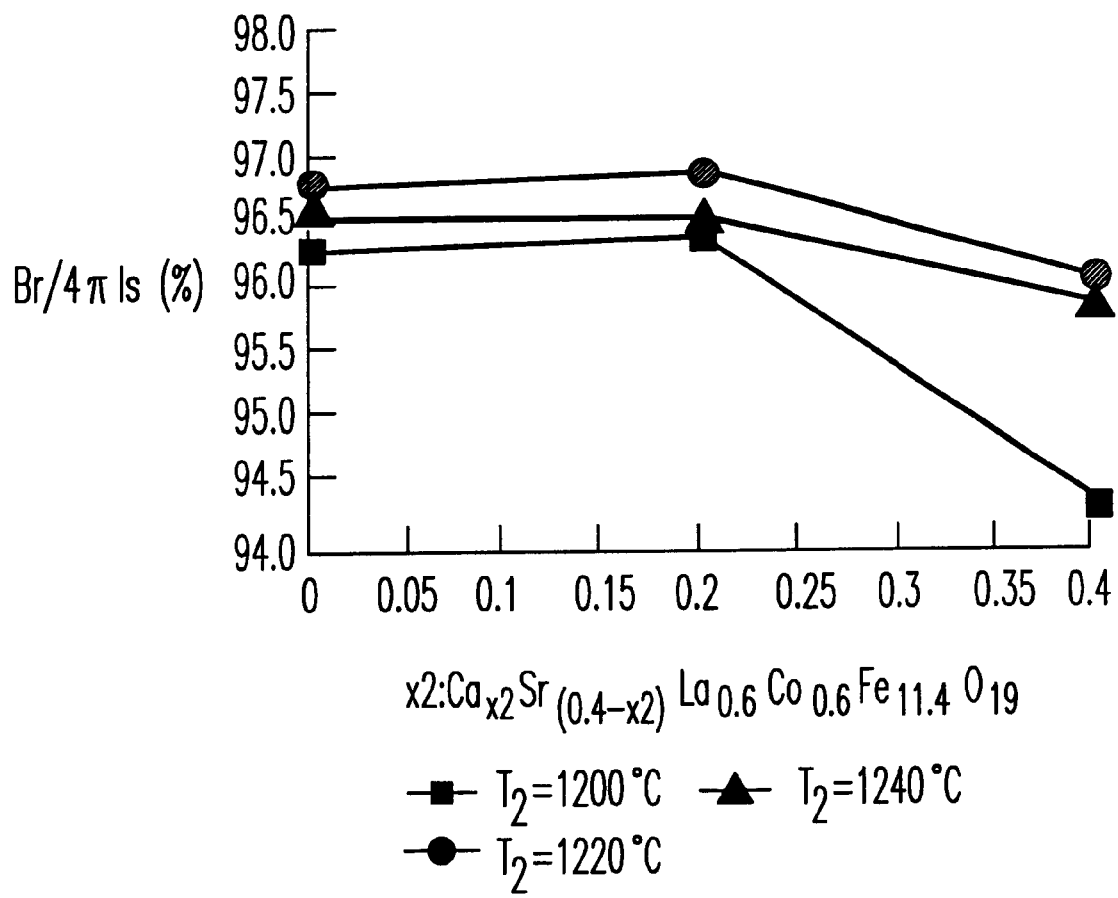

The HcJ was substantially not changed depending on the temperature. The magnetic characteristics of the sintered body sintered at 1,200° C. are shown in FIGS. 15 and 16. When x2 was 0.2, Br was 4.4 kG or more and HcJ was a value of 2.5 kOe or more. The temperature dependency of HcJ was substantially zero. The temperature dependency of HcJ of the calcined body was also substantially zero.

The effect of the invention is clear from the foregoing examples.

EFFECT OF THE INVENTION

As described in the foregoing, according to the invention, by realizing a hexagonal ferrite having a high saturation magnetization and a high magnetic anisotropy, a ferrite magnet having a high residual magnetic flux density and a high coercive force is provided, which cannot be attained by the conventional hexagonal ferrite magnet. Furthermore, a ferrite magnet having a high residual magnetic flux density and a high coercive force, and at the same time, excellent in temperature characteristics of the coercive force, with the coercive force being not lowered in the low temperature region is provided. A ferrite magnet having a high residual magnetic flux density and a high coercive force is realized by using relatively coarse ferrite grains having a grain diameter exceeding 1 μm. A magnetic recording medium having a high residual magnetic flux density and being thermally stable is provided.

What is claimed is:
1. An oxide magnetic material comprising a primary phase of a hexagonal ferrite containing metallic elements

Ca, R, Fe and M, where M represents at least one element selected from the group consisting of Co, Ni and Zn, and R represents at least one element selected from the group consisting of Bi and rare earth elements including Y, with La being essentially included in R; wherein proportions of said metallic elements Ca, R, Fe and M with respect to the total amount of said metallic elements are:

from 1 to 13 atomic % for Ca, from 0.05 to 10 atomic % for R, from 80 to 95 atomic % for Fe, and from 1 to 7 atomic % for M.

2. The oxide magnetic material as claimed in claim 1, wherein proportions of said metallic elements Ca, R, Fe and M is represented by formula (I):

$$Ca_{1-x}R_x(Fe_{12-y}M_y)_zO_{19} \quad (I)$$

wherein $0.2 \leq x \leq 0.8$, $0.2 \leq y \leq 1.0$, and $0.5 \leq z \leq 1.2$.

3. The oxide magnetic material as claimed in claim 1, wherein a proportion of Co in M is 10 atomic % or more.

4. Ferrite particles comprising the oxide magnetic material as claimed in claim 1.

5. Ferrite particles as claimed in claim 4, wherein said ferrite grains have a temperature dependency of a coercive force ΔHcJ/ΔT within the range of from −50 to 50° C. is from −5 to 5 Oe/° C.

6. A bonded magnet comprising ferrite particles as claimed in claim 4.

7. A magnetic recording medium comprising ferrite particles as claimed in claim 4.

8. A sintered magnet comprising the oxide magnetic material as claimed in claim 1.

9. The sintered magnet as claimed in claim 8, wherein said sintered magnet has an intrinsic coercive force HcJ in terms of kOe and a residual magnetic flux density Br in terms of kG satisfying the following conditions at 25° C.:

$$Br + \tfrac{1}{5}HcJ \geq 5.75 \text{ where } HcJ \geq 4 \quad (IV)$$

$$Br + \tfrac{1}{10}HcJ \geq 4.82 \text{ where } HcJ > 4 \quad (V).$$

10. A process for producing ferrite particles as claimed in claim 4, wherein calcination and/or sintering is conducted in an atmosphere having an oxygen partial pressure of more than 0.05 atm.

11. A process for producing a sintered magnet as claimed in claim 8, wherein calcination and/or sintering is conducted in an atmosphere having an oxygen partial pressure of more than 0.2 atm.

12. The sintered magnet as claimed in claim 8, wherein said sintered magnet has a temperature dependency of a coercive force ΔHcJ/ΔT within the range of from −50 to 50° C. that is from −5 to 10 Oe/° C.

* * * * *